United States Patent
Takeuchi et al.

(10) Patent No.: US 11,641,078 B1
(45) Date of Patent: May 2, 2023

(54) ASSEMBLIES FOR SEALING CABLE CONNECTIONS

(71) Applicant: Go!Foton Holdings, Inc., Somerset, NJ (US)

(72) Inventors: Kenichiro Takeuchi, North Brunswick, NJ (US); David Zhi Chen, Dallas, TX (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 17/944,711

(22) Filed: Sep. 14, 2022

(51) Int. Cl.
  H01R 13/639 (2006.01)
  H01R 13/52 (2006.01)
  H02G 15/013 (2006.01)

(52) U.S. Cl.
  CPC ..... *H01R 13/5213* (2013.01); *H01R 13/5202* (2013.01); *H01R 13/639* (2013.01); *H02G 15/013* (2013.01)

(58) Field of Classification Search
  CPC ............ H01R 13/5213; H01R 13/5202; H01R 13/639; H02G 15/013
  See application file for complete search history.

(56) References Cited

U.S. PATENT DOCUMENTS

| | | | | |
|---|---|---|---|---|
| 3,522,576 A | * | 8/1970 | Cairns ................. | H01R 13/523 439/796 |
| 3,680,036 A | * | 7/1972 | McCamis ............ | H01R 13/523 439/367 |
| 4,911,654 A | * | 3/1990 | Blaetz ................. | H01R 13/639 439/372 |
| 5,266,742 A | * | 11/1993 | Heier ................... | H02G 15/192 174/92 |
| 5,306,176 A | * | 4/1994 | Coffey ............... | H01R 13/6392 439/367 |
| 6,036,526 A | * | 3/2000 | Alfis, III .................. | H01R 4/70 439/369 |
| 7,097,486 B2 | * | 8/2006 | Parsons .............. | H01R 13/5202 439/291 |
| 10,658,790 B2 | * | 5/2020 | Finona ................. | H01R 13/641 |
| 2021/0391700 A1 | * | 12/2021 | Rech .................... | H02G 15/013 |
| 2022/0140552 A1 | * | 5/2022 | Jin ..................... | H01R 13/5202 439/626 |
| 2022/0229252 A1 | | 7/2022 | Takeuchi et al. | |

OTHER PUBLICATIONS

Takeuchi et al., U.S. Appl. No. 17/876,942, filed Jul. 29, 2022, titled "Outside Plant Cable Add and Drop Enclosure".

* cited by examiner

*Primary Examiner* — Tho D Ta
(74) *Attorney, Agent, or Firm* — Lerner David LLP

(57) ABSTRACT

A system for sealing a cable connection against external elements includes a duct, a first sealing portion and a second sealing portion. The duct has first and second ends and is configured to internally accommodate at least one cable connection element and an end of a cable. The first sealing portion is engageable to the first end of the duct such that when the first sealing portion is engaged to the first end of the duct, a watertight seal is created. The second sealing portion is engageable to the second end of the duct such that when the second sealing portion is engaged to the second end of the duct and the end of the cable is engaged to the second sealing portion, a watertight seal is created between the second sealing portion and the second end of the duct and between the second sealing portion and the end of the cable.

26 Claims, 10 Drawing Sheets

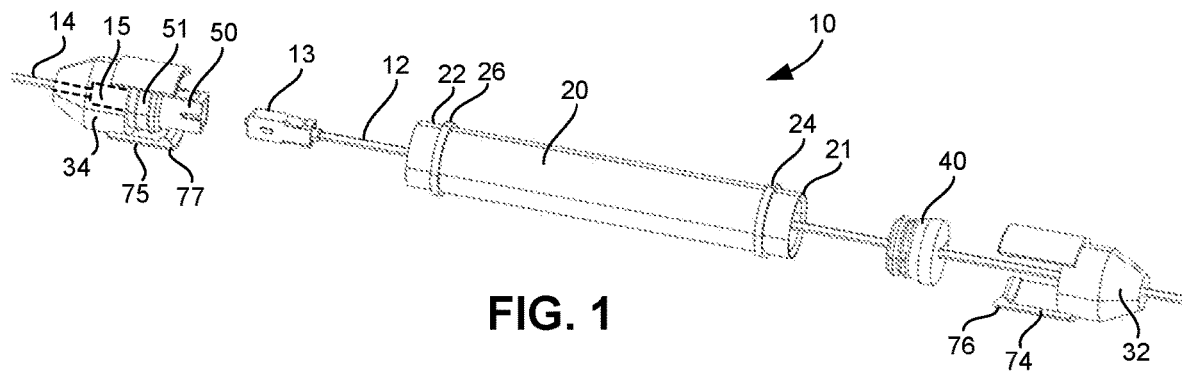
FIG. 1
FIG. 1A
FIG. 2
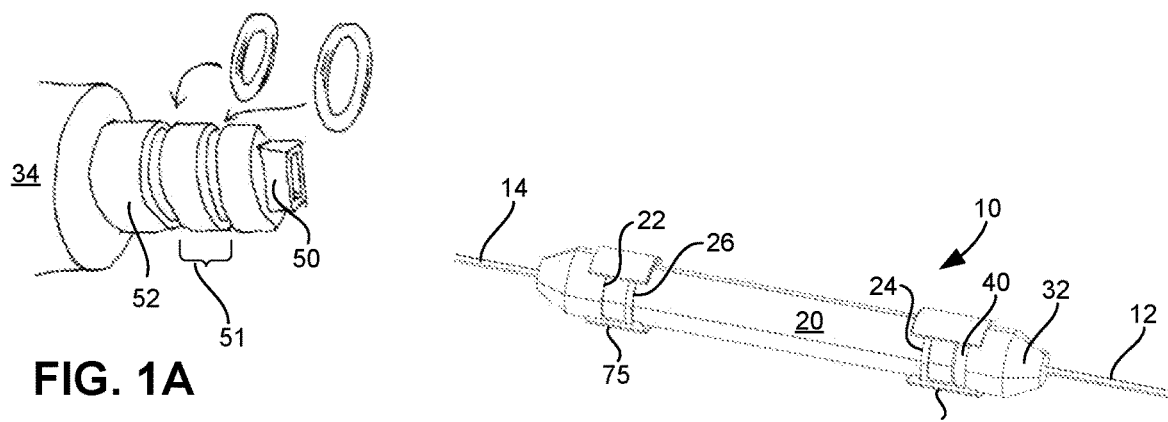
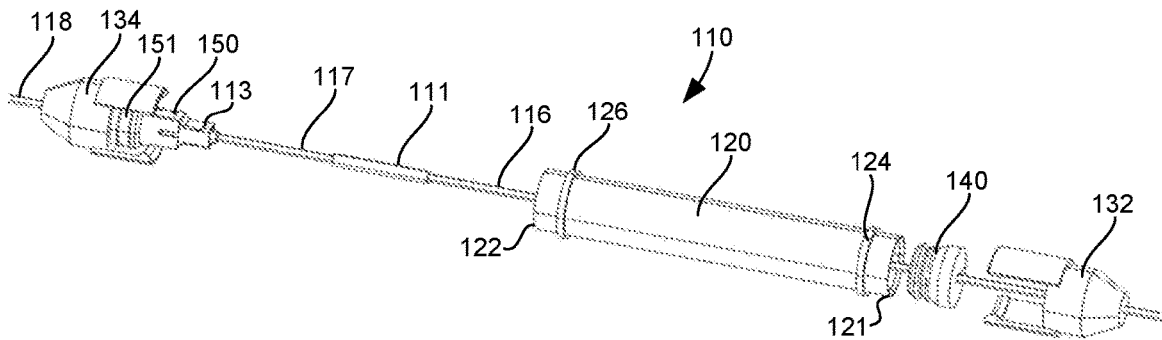
FIG. 3

ASSEMBLIES FOR SEALING CABLE CONNECTIONS

BACKGROUND

The increasing deployment of electronic and fiber optic networks has given rise to an increasing need to safely and effectively protect the distribution of signals in such networks.

The need to protect signal distribution is particularly acute with respect to fiber optic communications. For example, fiber optic communication signals between individual homes and a fiber network may be implemented through an Outside Plant (OSP) terminal, such as a drop box, so that lower capacity cables may be used to deliver communication signals to individual homes, rather than a high-capacity main cable that brings such signals from upstream locations. However, because it is desirable to configure OSP terminals to allow for simple connection and disconnection of lower capacity cables to accommodate the particular requirements of users surrounding an OSP terminal placement location, a concern arises in that the connection points may be exposed to the surrounding environment. And, Because OSP terminals are often positioned in outdoor locations exposed to nature, such exposure may be significantly detrimental to the lifespan of the connection locations and the overall performance of the cable. Further, these concerns are also present in other examples where any two cable ends are connected or spliced with each another. Accordingly, a need exists to improve cable connection technology to provide better tolerance for wear due to exposure such as that found in outdoor environments.

Further, OSP terminals, particularly in arrangements where many lower capacity cable connections are included, may occupy a significant amount of space. Thus, there is also a need to arrange such terminals in a more spatially efficient manner.

BRIEF SUMMARY

The present disclosure provides assemblies and larger systems to improve the ability for connections in cable networks to withstand the effects of exposure to outdoor environments. For example, connection enclosure assemblies are contemplated that provide ease of use in assembly along with connection and disconnection of cable ends, while also provide a watertight enclosed space. In other examples, multi-cable terminal structures include a plurality of cable enclosure assemblies arranged in a spatially efficient manner to maximize the number of service cables within a particular volume of space. This is accomplished all while preserving accessibility of cable ends that are used for connection in each individual assembly within the terminal.

In a first aspect, the present disclosure relates to a system for sealing a cable connection against external elements. In a first embodiment, a system includes a duct, a first sealing portion and a second sealing portion. The duct includes a first end and a second end and may be configured to internally accommodate at least one cable connection element and an end of a cable. The first sealing portion may be engageable to the first end of the duct such that when the first sealing portion is engaged to the first end of the duct a watertight seal is created between the first sealing portion and the first end of the duct. The second sealing portion may be engageable to the second end of the duct such that when the second sealing portion is engaged to the second end of the duct and the end of the cable is engaged to the second sealing portion a watertight seal is created between the second sealing portion and the second end of the duct and between the second sealing portion and the end of the cable. Further, the end of the cable is enclosed within a watertight volume when the first and second sealing portions are secured to respective first and second ends of the duct.

In some examples of the first embodiment, the duct may be cylindrically shaped. In other examples, the first sealing portion may include an O-ring for mating with the first end of the duct. In further examples, the second sealing portion may include a grommet configured for insertion into the second end of the duct and having an opening for accommodating the cable. In still further examples, the system may also include a restraint for engaging the second sealing portion to the second end of the duct. In other examples, the at least one cable connection element may include an adapter. In still further examples, the system may also include a housing such that the first sealing portion is disposed in the housing. In such examples, the first sealing portion may be resilient such that the duct is rotationally movable relative to the housing. For instance, the duct may be rotatable 360 degrees about a base of the duct located at the first sealing portion.

In a second embodiment, a system for sealing a cable connection against external elements includes a housing and at least one duct. The housing may include at least one contour provided on the exterior of the housing, and at least one first sealing portion associated with respective ones of the at least one contour, each first sealing portion positioned at a first end of the housing and aligned with the corresponding contour of the at least one contour. The first sealing portion may be configured to secure at least one cable connection element. The at least one duct may be positioned within or on a respective one of the at least one contour. Each duct has a first end and a second end and may be configured to internally accommodate the at least one cable connection element and at least one end of a cable. The first end of the duct may be engageable to the first sealing portion such that when the first sealing portion is engaged to the first end of the duct, a watertight seal is created between the first sealing portion and the first end of the duct. The second end of the duct may be engageable to a second sealing portion such that when the second sealing portion is engaged to the second end of the duct and the cable is secured to the second sealing portion, a watertight seal is created between the second sealing portion and the second end of the duct and between the second sealing portion and the end of the cable. And, when the second end of the duct is secured to the second sealing portion, a portion of the duct proximate to the second end of the duct is disposed on the respective ones of the at least one contour.

In some examples of the second embodiment, the at least one duct may be cylindrically shaped. In some examples, the system may also include at least one latching mechanism for securing respective ones of the at least one duct within respective ones of the at least one contour. In a subset of these examples, each latching mechanism may be configured to secure the second sealing portion to the second end of the duct upon movement of the latching mechanism into a closed position. In other examples, for each contour of the at least one contour, when the latching mechanism is in an open position, the duct is movable along a longitudinal axis of the contour. In still further examples, each latching mechanism may include a lever and a latch and is rotatably secured to the housing. In further examples, the lever may be rotatably secured to the housing, and the latch is rotatably secured to the lever. In other examples, the system may include a resilient member secured to the housing and each latching mechanism may include a lever and a latch for rotatable securement to the resilient member. In some of these examples, the resilient member is a distribution portion, and the at least one contour separates the distribution portion from a base portion of the housing. In a subset of these examples, each latching mechanism includes a lever and a latch and is rotatably secured to the distribution portion. In further examples, the lever may be rotatably secured to the distribution portion, and the latch may be rotatably secured to the lever. In still further examples, the distribution portion may include at least one cable anchor corresponding to respective ones of the at least one contour.

In other examples of the second embodiment, the second sealing portion may include a grommet configured for insertion into the second end of the duct and having an opening for accommodating the cable. In some examples, the housing may include at least one cable anchor corresponding to respective ones of the at least one contour. In some examples, the system may include a plurality of contours and the contours may be arranged in a linear alignment with each other. In some examples, the system may include a plurality of contours and the contours may be arranged in a two-dimensional alignment with each other. In some examples, the contours may be arranged in a honeycomb shaped alignment. In some examples, the contours may be arranged in a circular shaped alignment. In further examples, the at least one cable connection element may include an adapter. In some examples, each first sealing portion may include an O-ring for mating with the first end of the corresponding duct. In some examples, the housing may include an opening for receiving a main cable.

In still further examples of the second embodiment, the housing may be part of a cable enclosure. The cable enclosure may include a main portion and a sealing assembly. The sealing assembly may be configured to accommodate at least one main cable portion and provide a watertight seal between the sealing assembly and the at least one main cable portion. The cable enclosure may further be configured to provide a watertight seal between the sealing assembly and the main portion. In other examples including the cable enclosure, the main portion may include a slack tray, a splice tray and a separator. The slack tray may be configured to house a portion of the at least one cable portion and the separator may be configured to house at least a portion of an intermediate cable. In these examples, one or more fibers from the at least one main cable portion may be spliced to one or more fibers from the intermediate cable at the splice tray. In other examples, the housing may be mounted on the main portion of the cable enclosure. In still further examples, the housing may be an integral part of the main portion of the cable enclosure. In further examples, the housing may be mounted on another part of the cable enclosure. In yet another example, the housing may also include a distribution portion and a base portion separated from the distribution portion by the at least one contour. Further, the system may include a duct span including a duct of the at least one duct that extends from the base portion to the distribution portion. The duct span may include a first segment proximal to the base portion that has a smaller diameter than a second segment where the second segment extends between the first segment and the distribution portion.

In a third embodiment, a system includes a housing and at least one duct. The housing may have at least one contour provided on the exterior of the housing. The housing may also have at least one first sealing portion associated with respective ones of the at least one contour, each first sealing portion positioned at a first end of the housing opposite the corresponding contour and configured to secure at least one cable connection element. The at least one duct may be positioned within respective ones of the at least one contour, each duct having a first end and a second end and being configured to internally accommodate the at least one cable connection element and at least one end of a cable. The first end of the duct may be engageable to the first sealing portion such that when the first sealing portion is engaged to the first end of the duct, a watertight seal is created between the first sealing portion and the first end of the duct. The second end of the duct may be disposed in the contour and engaged to a second sealing portion such that when the second sealing portion is engaged to the second end of the duct, a watertight seal is created between the second sealing portion and the second end of the duct and between the second sealing portion and the end of the cable. In this embodiment, the end of the cable is enclosed within a watertight volume when the first and second sealing portions are engaged to respective first and second ends of the duct.

BRIEF DESCRIPTION OF THE DRAWINGS

The accompanying drawings are not intended to be drawn to scale. Also, for purposes of clarity not every component may be labeled in every drawing.

FIG. 1 illustrates a perspective view of a connection enclosure assembly with a disconnected cable end according to one embodiment of the present disclosure;

FIG. 1A is a close-up partial view of the connection enclosure assembly of FIG. 1;

FIG. 2 illustrates a perspective view of the connection enclosure assembly of FIG. 1 with the cable end sealed;

FIG. 3 illustrates a perspective view of a connection enclosure assembly according to one embodiment of the present disclosure;

DETAILED DESCRIPTION

Figure 4:
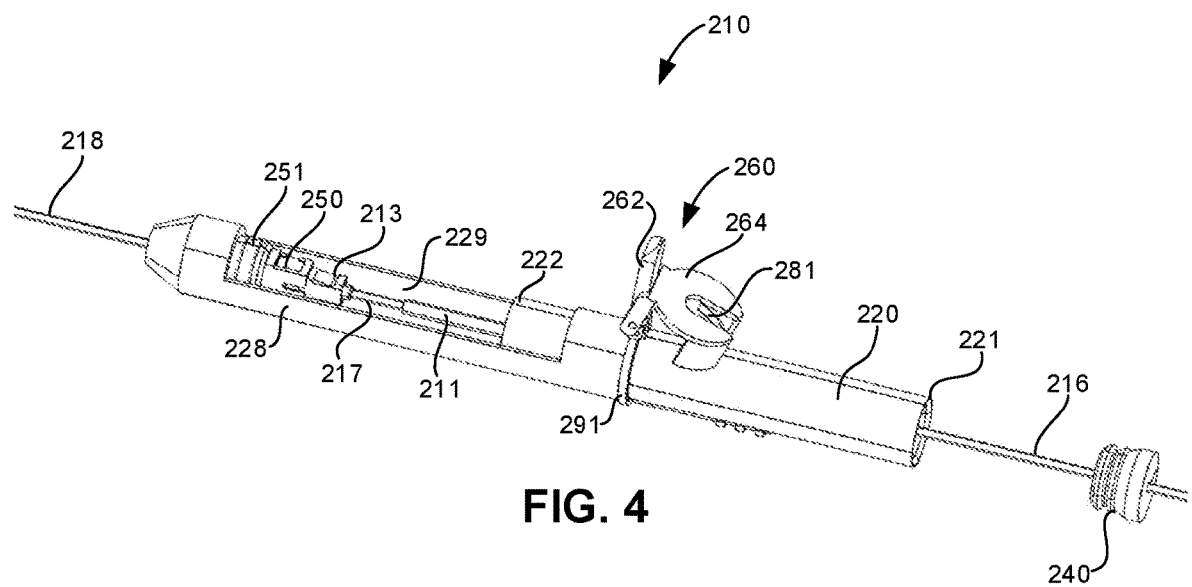
FIG. 4 illustrates a perspective view of a connection enclosure assembly with an unsealed cable end according to one embodiment of the present disclosure.

It should be understood that the words "example" and "exemplary" are used herein to mean "serving as an example, instance, or illustration." Any embodiment or feature described herein as being an "example" or "exemplary" should not be construed as preferred or advantageous over other embodiments or features unless explicitly stated as such. In the following description, reference is made to the accompanying figures, which form a part of the present disclosure. Other embodiments may be utilized, and other changes may be made, without departing from the spirit or scope of the subject matter presented herein.

The example embodiments described herein are not meant to be limiting. It will be readily understood that the aspects of the present disclosure, as generally described herein and illustrated in the figures, can be arranged, substituted, combined, separated, and designed in a wide variety of different configurations, all of which are explicitly contemplated herein.

In one aspect, the present disclosure relates to connection enclosure assemblies adapted to create a watertight seal around connected cable ends. Cables used in such assemblies may be fiber optic cables comprising any number of fibers. In other examples not specifically referenced herein, cables may be electronic cables or other types of cables. These connection enclosure assemblies may in some cases also be referred to as single duct terminals. FIGS. 1-2 illustrate a connection enclosure assembly 10 according to one embodiment. Assembly 10 is configured to provide a sealed enclosure around connected ends of at least two cable portions.

In the particular example shown in FIGS. 1 and 2, a connection between first cable portion 12 and second cable portion 14 is enclosed by assembly 10. Specifically, an adapter 50 that receives first cable connector 13 at an end of first cable portion 12 and a second cable connector 15 of second cable portion 14 is sealed within assembly 10. Assembly 10 includes, from one end to the other, a first sealing portion 32, a grommet 40, a duct 20 and a second sealing portion 34. In some examples, duct 20 may be a tubular and cylindrically shaped structure, as shown in FIGS. 1-2. Duct 20 includes first and second stopper rings 24, 26 positioned and sized to restrain axial movement of the sealing portions when assembly 10 is in an assembled state. In some examples, the stopper rings may be fabricated as integral with a remainder of the duct. In further examples, the stopper rings may be an attachable c-ring. In still further examples, a closed-loop stopper ring may be attachable over the duct to create stopper ring. In some instances, the ring may be inserted over the duct by first heating the ring. A weld or fasteners may be used to secure the stopper ring into place. In any of the above examples, the stopper ring may be complemented by an annular recess in the duct sized to receive the stopper ring.

Grommet 40 is sized for receipt in a lumen of duct 20 at first end 21, and first sealing portion 32 is configured for slidable insertion over grommet 40 and first end 21 of duct 20. First sealing portion 32 includes first grip portions 74 shaped to fit over an outer surface of duct, the first grip portions including projections 76 to engage first stopper ring 24, as shown in FIG. 2. In this way, the grip portion functions as a catch by catching the stopper ring, the stopper ring having a larger diameter than other outer surfaces of the duct. The combination of first sealing portion 32 and grommet 40 provides a means for the creation of a watertight seal at first end 21 of the duct.

At second end 22 of duct 20, second sealing portion 34 includes a receiving surface 51 configured for slidable insertion into second end 22 of duct. Receiving surface 51 may be a resilient material, such as rubber. In some examples, receiving surface is a surface of a pair of closed-loop rings disposed on a central support structure 52 within second sealing portion 34, as shown in FIG. 1A. Closed-loop rings as contemplated for use in the central support structure may be O-rings. In some examples, a diameter of the pair of rings in an unloaded condition is slightly larger than an inner diameter of the duct to aid in the creation of a water-tight seal when the duct is received over the receiving surface. Second sealing portion 34 also includes second grip portion 75 configured for slidable insertion over stopper ring 26 of duct 20 so that projections 77 on second grip portion 75 catch the stopper ring. In a closed condition, as shown in FIG. 2, adapter 50 and first cable connector 13 are entirely enclosed by assembly 10 via a watertight seal.

Adapter 50 may be a device that is configured to operatively connect two different cable ends, including fiber optic cable ends. Such adapters may be single fiber connectors ("SC adapter"), lucent connectors ("LC adapter") miniature duplex connectors ("MDC adapter"), or MPO connectors ("MPO adapter"), among others. As depicted, adapter 50 includes ports to receive first cable connector 13 and second cable connector 15, as shown in FIG. 1.

Connection enclosure assembly 10 is advantageous in that it provides structure to ensure that a cable end is located within a watertight enclosure protected from external exposure. Further, the assembly is arranged so that it is not difficult to close or open, rendering it a straightforward process to connect and disconnect cable ends. The assembly is also advantageous in that duct 20 may have a tube shape or another similar shape that facilitates sliding of the duct into the first and second sealing end portions, even by hand. And, similarly, when used as part of a multi-cable terminal, the assembly is slidable into and out of portals in such multi-cable terminal. Additionally, when the duct is a tube, it is always universally symmetrical in cross-section, no matter its rotational position. In this manner, there is no need to check or adjust the rotational orientation of the duct once it is disposed in sealing portions at its ends or when it is disposed in a terminal. Yet another advantage is that a length of the duct may be adjusted or modified to suit field conditions where it will be used.

Parts of assembly 10 may be fabricated using various polymeric and metallic materials. For example, grommet 40 and a pair of rings defining receiving surface 51 may both be a rubber material, while duct 20 and outer structures of first and second sealing portions 32, 34 may be other polymeric materials. The stopper rings may be a metal or hard plastic material. Adapter may be a polymeric material in some examples. Grip portions configured to catch surfaces on the duct may be made of resilient materials. Materials for the cable connectors may be a function of the type of cable used and/or the properties of the adapter. In further examples, composite materials or other combinations of materials may be used for one or more parts of the assembly.

FIG. 3 illustrates a connection enclosure assembly 110 according to one embodiment of the present disclosure.

Reference numerals in the 100-series of reference numerals for connection enclosure assembly 110 refer to like elements in the 10-series of reference numerals shown in FIGS. 1-2, unless otherwise noted. Assembly 110 includes a first sealing portion 132, grommet 140, duct 120, adapter 150, and second sealing portion 134. Sealing portions 132, 134 and duct 120 share the same structure as that of respective sealing portions and duct in assembly 10 shown in FIGS. 1-2. However, in this embodiment, the cable portion through the duct may be derived from two separate cable portions: First cable portion 116 and second cable portion 117. These cable portions may be spliced and covered by splice protection tube 111, thereby providing protection at the ends of the cable portions. By including a splice location remote from adapter 150, an enclosure may be realized from a starting point where cable portions are already engaged at both ends of adapter 150. In particular, such a starting point may be one where first cable connector 113 at end of second cable portion 117 is connected to adapter 150 and second cable connector (not shown) at an end of third cable portion 118 is connected to adapter 150, both cable ends being preassembled to be connected to the adapter. It should be appreciated that to the extent the cable connections vary between the embodiment of FIGS. 1-2 and the embodiment of FIG. 3, either such arrangement may be employed in any of the embodiments contemplated by the present disclosure.

Figure 5:
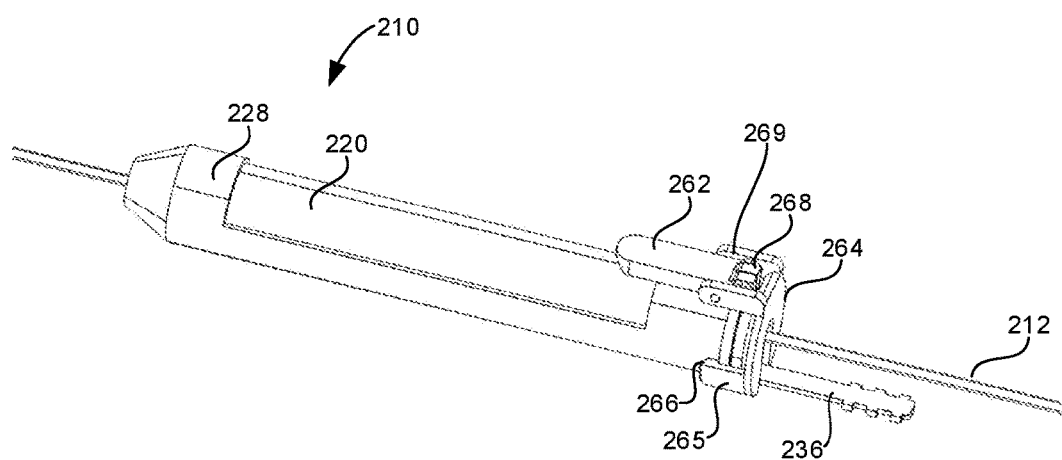
FIG. 5 illustrates a perspective view of the connection enclosure assembly of FIG. 4 with the cable end sealed.

FIGS. 4-5 illustrate a connection enclosure assembly 210 according to one embodiment of the present disclosure. Reference numerals in the 200-series of reference numerals for connection enclosure assembly 210 refer to like elements in the 10-series of reference numerals shown in FIGS. 1-2, unless otherwise noted. Connection enclosure assembly 210 includes an outer enclosure 228 with an adapter 250 attached thereto, a grommet 240 and a duct 220.

Outer enclosure 228 may be tubular in shape and extends from an open end with an annular ridge 291 to a closed end with a support holding adapter 250. Outer enclosure 228 includes a window 229 so that cable run through the assembly is accessible before the outer enclosure receives a duct. At the open end of outer enclosure 228, annular ridge 291 may be a stopper ring. And, also at the open end, a restraint in the form of a latch 260 is attached along with, optionally, a cable anchor 236. Cable anchor 236 may have resilient material properties and may be configured for receiving a tie or strap to tie a cable extending out of assembly 210 in place. At the closed end of outer enclosure, a centrally disposed support extends inward into the lumen of the outer enclosure with adapter 250 attached at its end, as shown in FIG. 4. On the support itself are a pair of rings that define a receiving surface 251.

Turning to the details of the latch in particular, the latch mechanism may include a latch structure and a lever arm to lock the latch structure. In the example of assembly 210, latch 260 includes lever arm 262 and closure arm 264. Closure arm 264 further includes grip portion 265 with engagement features, such as protrusions 266, to engage with outer enclosure 228, such as through engagement with annular ridge 291. Lever arm 262 and closure arm 264 are operatively connected to one another via arm pin 269 such that closure arm 264 rotates about a pin axis of arm pin. Further, lever arm 262 is operatively connected to outer enclosure 228 via a housing pin 268 separate from arm pin 269. Latch 260 is arranged such that lever arm 262 is rotatable relative to outer enclosure 228 and closure arm 264, with arm pin 269 moving about housing pin 268 as lever arm 262 is rotated, and housing pin 268 remaining stationary. Lever arm 262 may have an elongate shape while closure arm 264 may have a shape and size to fit over a perimeter of outer enclosure 228, and may further include a slot 281 extending inward from an edge of closure arm 264 opposite lever arm 262. Slot 281 may be sized so that when latch 260 is closed, a cable may pass therethrough. Further, in some examples where outer enclosure 228 includes a cable anchor 236, such cable anchor may also pass through slot 281. Latch 260 is configured to be adjustable from an open position as shown in FIG. 4 to a closed position shown in FIG. 5. In the open position, closure arm 264 is loose so that an object, such as duct 220, may be passed into outer enclosure 228. In FIG. 4, duct 220 is partially disposed in outer enclosure 228, such disposal being made possible by the position of closure arm 264. In FIG. 5, duct 220 is fully disposed within outer enclosure 228 and sealed through closure of latch 260, i.e., with contents inside duct 220 in a watertight enclosure.

A watertight seal may be created at both ends of the assembly. At a closed end of outer enclosure, receiving surface 251, with a diameter that may be larger than an inner surface of duct 220, is configured to receive second end 222 of duct 220. First end 221 of duct 220 is configured to receive grommet 240 with latch 260 securing grommet 240 in place, as shown in FIG. 5. Grip portion 265 engagement features are engageable with complementary engagement features on outer enclosure 228. In FIGS. 4 and 5 in particular, protrusion 266 catches annular ridge 291 to engage the latch with the outer enclosure. The closure of the duct using these features provides a watertight seal. In other examples, engagement features on grip portion 265 and outer enclosure 228 may vary from that shown in FIGS. 4 and 5. For example, annular ridge 291 may be a stopper ring disposed on the outer enclosure offset from an open end of the outer enclosure. The mechanics of using latch 260 to hold grommet 240 in place to create a seal are described in greater detail elsewhere in the present disclosure in the description of the methods of using connection enclosure assembly 210.

Figure 6:
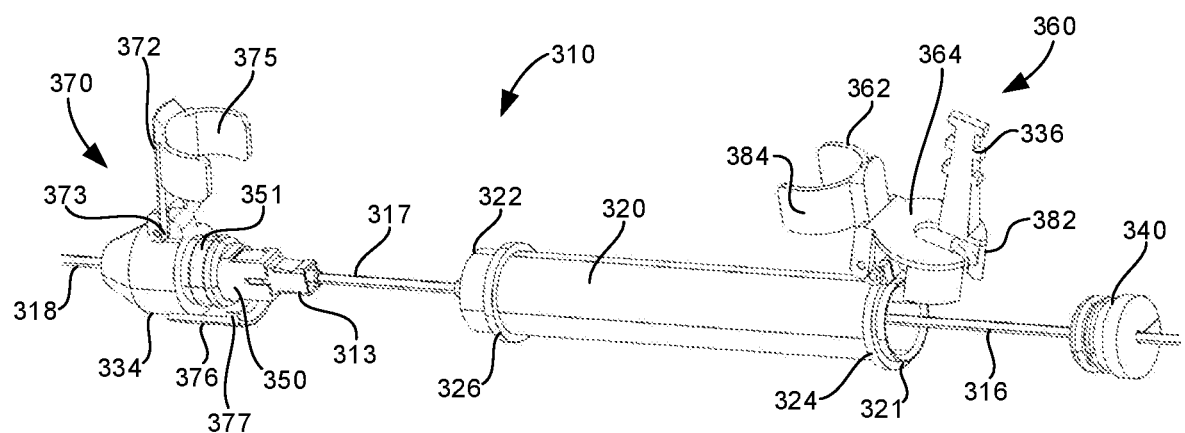
FIG. 6 illustrates a perspective view of a connection enclosure assembly with an unsealed cable end according to one embodiment of the present disclosure.
Figure 7:
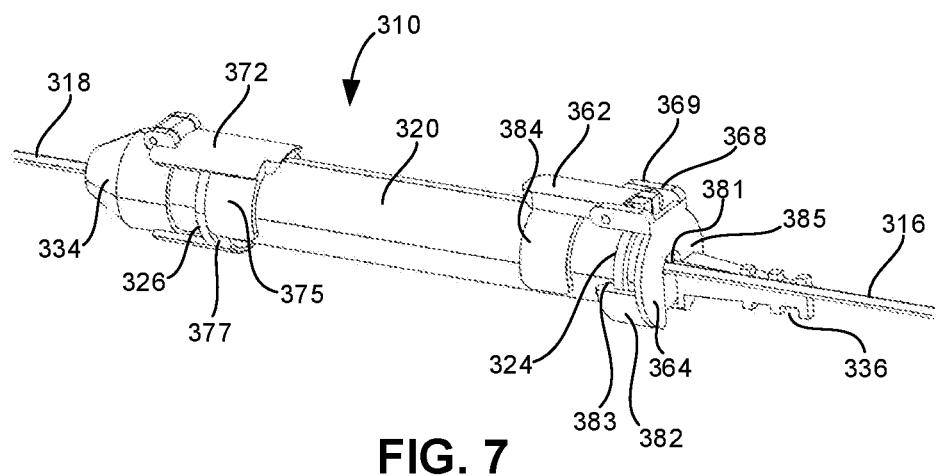
FIG. 7 illustrates a perspective view of the connection enclosure assembly of FIG. 6 with the cable end sealed.

FIG. 6-7 illustrate a connection enclosure assembly 310 according to one embodiment of the present disclosure. Reference numerals in the 300-series of reference numerals for connection enclosure assembly 310 refer to like elements in the 10-series of reference numerals shown in FIGS. 1-2, unless otherwise noted. Assembly 310 includes a grommet 340, a duct 320 and a sealing portion 334.

Duct 320 extends from first end 321 to second end 322 with a lumen therethrough. Adjacent to first end 321 is an annular first stopper ring 324 and adjacent to second end 322 to a second stopper ring 326. Such stopper rings may be separate elements slidably disposed on duct 320, or may be formed integrally with duct 320, and may be variations of stopper rings as described elsewhere in the present disclosure. Duct 320 also includes latch 360 attached to duct 320 at first stopper ring 324, as shown in FIG. 6. Although latch 360 is attached in alignment with first stopper ring 324, it should be appreciated that an attachment location between first latch 360 and duct 320 may be varied from that shown in the depicted embodiment. First latch 360 includes lever arm 362 and first closure arm 364. First lever arm 362 includes second grip portion 384 extending from an elongate portion of the first lever arm. Second grip portion 384 has an inner surface shaped to conform to an outer surface of duct 320. As shown, second grip portion 384 is c-shaped and has a curve that is approximately semi-circular in extent, or slightly more than 180 degrees around an outer surface of the duct. In some examples, the inner surface of second grip portion 384 may be biased inward so that second grip portion 384 may snap into place over the duct 320 to prevent its removal from the duct without the application of a pulling force. Engagement of second grip portion 384 with duct 320 is also known as duct catching. In the example shown, duct 320 is tube-shaped, and thus second grip portion has an annular-shaped inner surface with a sectional-dimension extending over a portion of a circumference of the duct. First closure arm 364 has a shape that complements a sectional shape of first end 321 of duct 320 with a slightly larger size to fit over such first end 321. On an end face 385 of first closure arm 364 is a slot 381 extending from one side of the first closure arm to its sectional center. Also on an end face of first closure arm as an optional feature is first cable anchor 336, positioned adjacent to slot 381. In variations, the first cable anchor may be disposed at other locations on end face 385 surface. First closure arm 364 also includes first grip portion 382 extending in a direction opposite the end face, first grip portion 382 also having an outer profile matching that of the end face of first closure arm 364. First grip portion 382 has an inner surface (not shown) to complement an outer surface of duct 320, and a projection 383 or projections extending inward from first grip portion 382. Such structure facilitates engagement between first closure arm 364 and duct 320, as described in greater detail in the methods of the present disclosure. As a general matter, grip portion 384 is optional and provides additional support to hold the duct, while securement of closure arm 364 provides compression against grommet 340 into the duct to create a watertight seal.

Sealing portion 334 includes a support with receiving surface 351, adapter 350, second latch 370 and fourth grip portion 376. Receiving surface 351 may be surfaces of a pair of rings configured for engagement with duct 320. Second latch 370 includes a first lever arm 372 attached at a second housing axis 373. First lever arm 372 includes a third grip portion 375. The third grip portion may have the same structure as second grip portion 384, as shown in FIGS. 6 and 7, such that third grip portion 375 is adapted to engage with duct 320 and prevented from backout by second stopper ring 326 when engaged. Fourth grip portion 376 includes a free end with an inner surface shaped to complement an outer surface of duct 320 at second end 322, the inner surface including projection 377. Fourth grip portion 376 has an elongate dimension such that when duct is fully advanced into sealing portion 334, as shown in FIG. 7, projection 377 catches and snaps over second stopper ring 326 to engage with the second stopper ring.

The connection enclosure assembly may be varied in many ways. While the depicted embodiments show a cylindrical tube-shaped duct, the duct may also have other shapes, such as ovular, partially rounded cross sections with some flat surfaces or even polygonal cross sections. Further, any single end features in any one of the depicted embodiments may be utilized in any other duct end for a connection enclosure assembly.

In another aspect, the present disclosure relates to a cable enclosure that is configured to receive one or more connection enclosure assemblies, i.e., single duct terminals. In many instances, the cable enclosure may include one or more multi-cable terminals. Such terminals not only protect cable connection points, but also serve to sort input feeder cable, i.e., main cable, into separate outputs, e.g., separate distribution or service cables. Such cable enclosure may serve as a system to protect cable connections against exposure to outdoor weather conditions.

Figure 8:
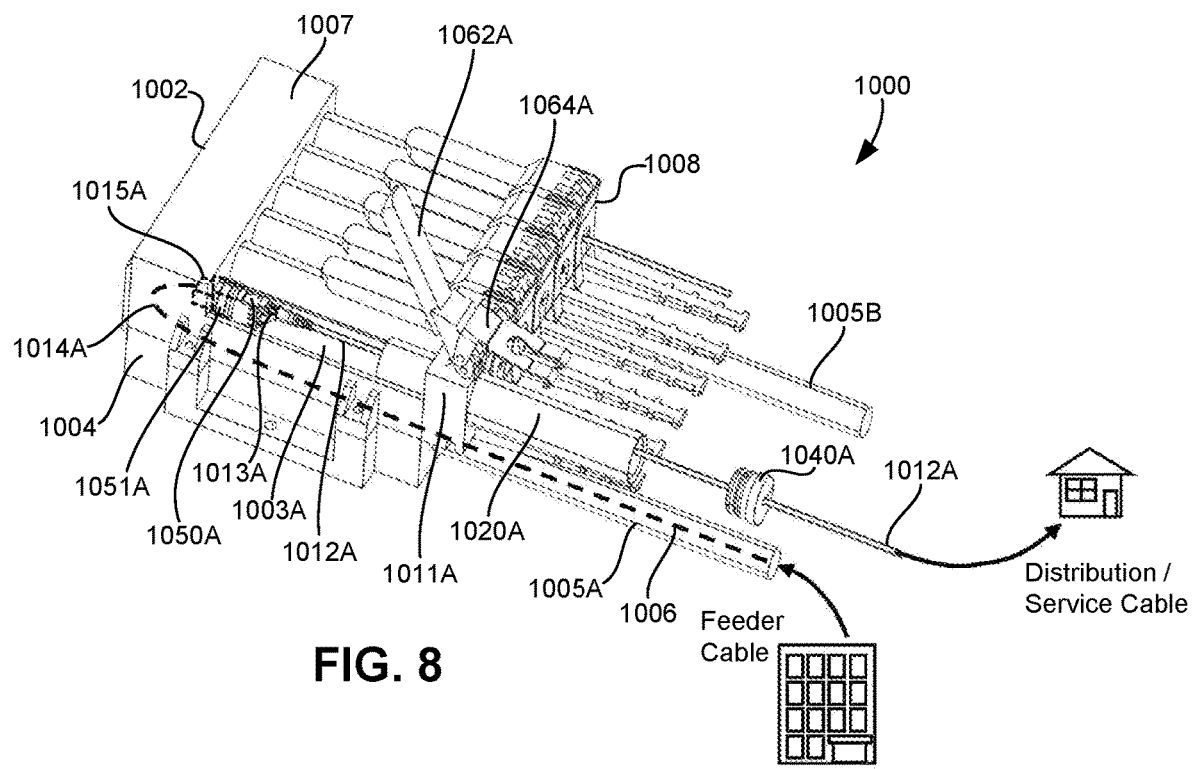
FIG. 8 illustrates a perspective view of a cable enclosure according to one embodiment of the present disclosure.
Figure 9:
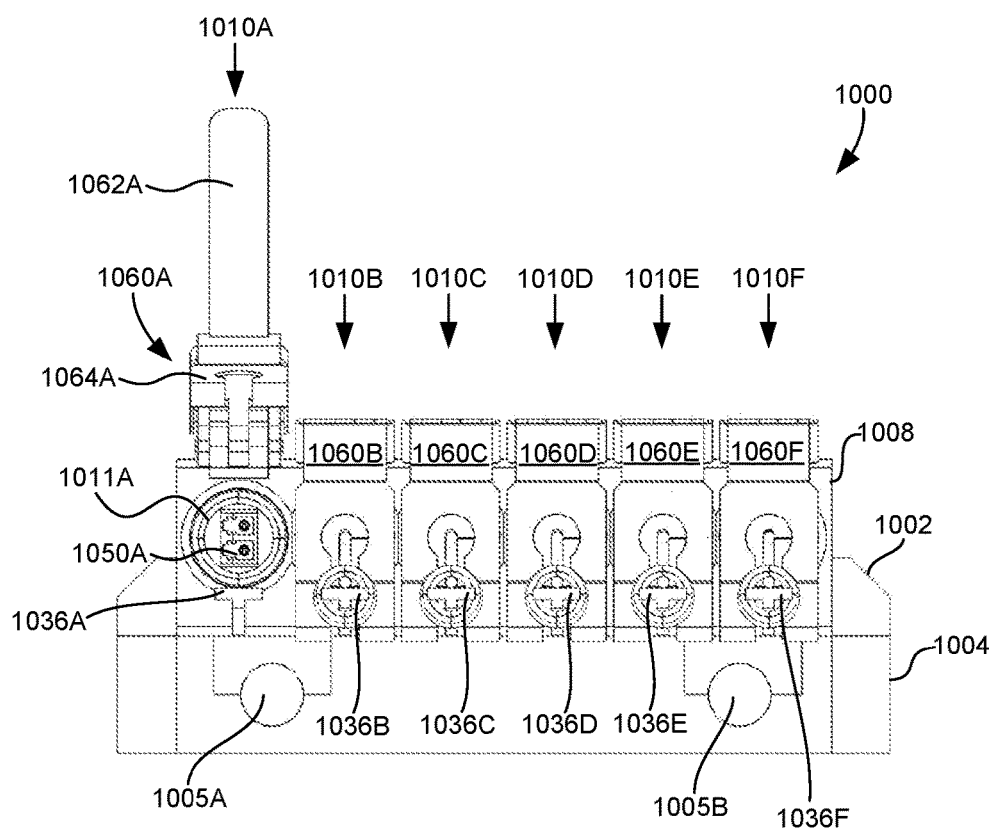
FIG. 9 illustrates a front view of the cable enclosure of FIG. 8.

One embodiment of a cable enclosure is shown in FIGS. 8-12. Cable enclosure 1000 includes an input cable housing 1004 and a multi-cable terminal housing 1002 disposed thereon. Input cable housing 1004 serves to receive feeder cable, described here as a main cable 1005A, B, into cable enclosure 1000, while housing 1002 includes one or more connection enclosure assemblies 1010A-1010F to distribute service cables fed into the respective connection enclosure assemblies from the main cable. For cable enclosure 1000 in particular, and as shown in FIGS. 8-9, six different connection enclosure assemblies 1010A-1010F are disposed in multi-cable terminal housing 1002. And, each of these is arranged in a linear alignment in parallel and through a single plane. Put another way, the arrangement of the connection enclosure assemblies is flat over the input cable housing. In a variation, a plurality of connection enclosure assemblies may be arranged within the single plane but with two or more of the assemblies non-parallel with each other. Such an arrangement may be characterized as a two-dimensional alignment, which also encompasses the linear alignment shown in FIG. 8.

Figure 12:
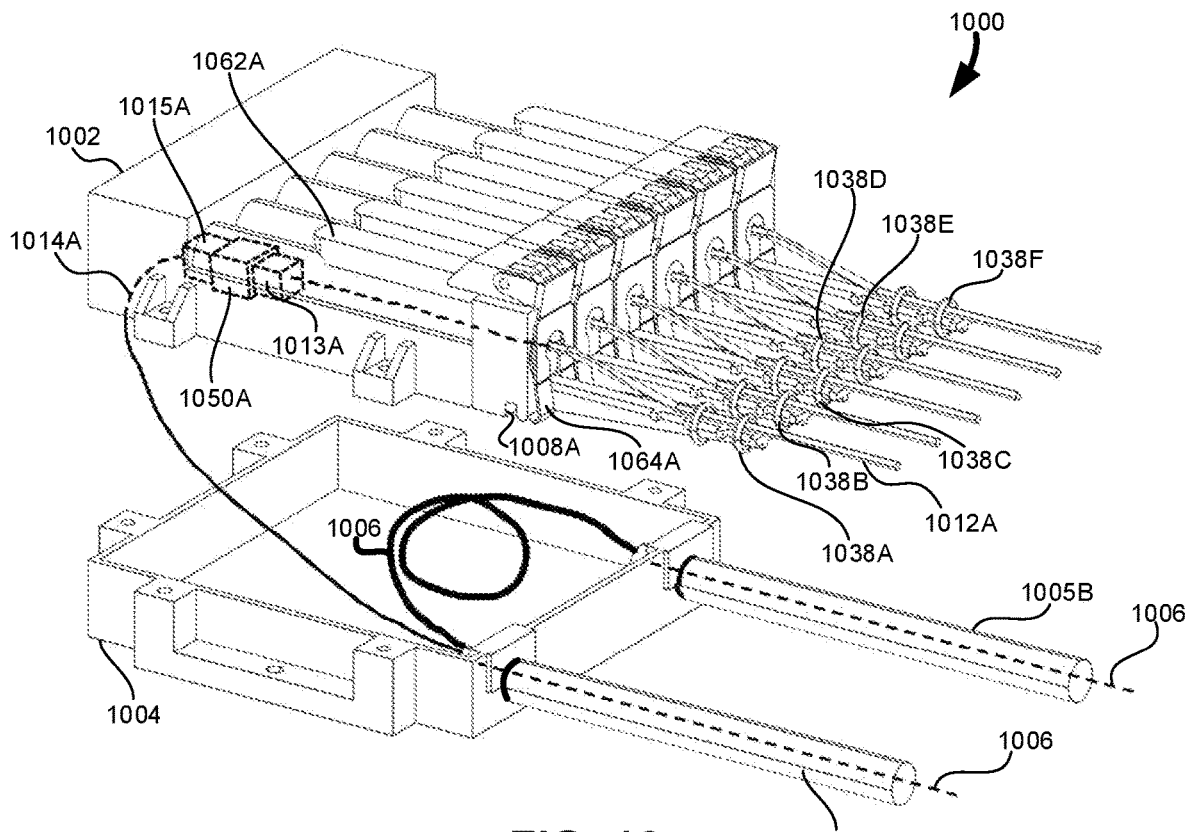
FIG. 12 illustrates a partially-exploded perspective view of the cable enclosure of FIG. 8 with all cable ends sealed.

Input cable housing 1004 may be an enclosed frame such as that shown in FIG. 12 with openings on a wall or walls of the enclosure to receive a main cable portion. Such main cable portion may be one or more duct structures. In FIG. 12, the main cable portion is two main cables 1005A, 1005B. Each main cable 1005A, 1005B is configured to carry one or more inner cables 1006 therethrough, as also shown in FIG. 12. Main cables 1005A, 1005B may take the form of a multiple of fibers contained within a cable jacket, or a multiple of smaller cables contained within a cable jacket. Further, in the case of a cable portion taking the form of smaller cables contained within a cable jacket, each of the smaller cables may, in turn, take the form of a single fiber within a cable jacket, a multiple of fibers within a cable jacket, or a multiple of smaller cables within a cable jacket. Also, main cables 1005A, 1005B may be respective parts of two distinct cables, or may be parts of a single cable.

The input cable housing may be square, rectangular, or any other shape. In some examples, a shape of input cable housing matches that of multi-cable terminal housing 1002 to minimize a volume occupied by cable enclosure 1000. Input cable housing 1004 may also include latches, openings or other engagement features where such features may complement similar features on multi-cable terminal housing 1002 to secure input cable housing 1004 to multi-cable terminal housing 1002. This is shown in FIG. 12, for example, where screws may be used to secure external engagement features on the walls of the respective housings 1002, 1004.

Multi-cable terminal housing 1002 may be an enclosed frame as shown in FIG. 8, with an open region in between a base portion 1007 and a distribution portion 1008. The connection enclosure assemblies may be received in multi-cable terminal housing 1002 such that a length of each duct may span a distance between base portion 1007 and distribution portion 1008. Securement of each connection enclosure assembly 1010A-1010F may be via receipt of the respective assemblies in contoured surfaces within housing 1002, such as receipt in a respective enclosed channel 1011A-F in distribution portion 1008 (in FIGS. 8 and 9, channel 1011A is indicated). Channels 1011A-F correspond to insertion pathways for assemblies 1010A-1010F, respectively. In this way, one end of the duct is received over a receiving surface, e.g., a surface of a pair of rings, at the base portion while an opposite end is received in an enclosed channel in the distribution portion. More specifically, and with reference to first connection enclosure assembly 1010A as an example, a receiving surface 1051A support structure adjacent to adapter 1050A is supported in place within an opening in base portion 1007, with duct 1020A receivable on receiving surface 1051A. And, an opposite end of duct 1020A is receivable within enclosed channel 1011A in distribution portion 1008.

Optionally, housing 1002 may further include additional contoured surfaces in the form of open-faced channels (e.g., open-faced channel 1003A shown in FIG. 8) spanning a distance between base portion 1007 and distribution portion 1008. Such open-faced channels may have partial c-shaped cross-sections sized to receive ducts of connection enclosure assemblies and may be positioned in alignment with respective insertion paths for each connection enclosure assembly 1010A-F between respective enclosed channels and receiving surfaces. In variations of the multi-cable terminal housing that include open-faced channels, such as housing 1002 shown in FIGS. 8-12, duct 1020A of first connection enclosure assembly 1010A may be slid along a respective one of such open-faced channels, i.e., channel 1003A, as the leading end of the duct is advanced into engagement with a receiving surface, i.e., receiving surface 1051A. These open-faced channels provide additional support for passage of ducts into the terminal housing and ensure that the ducts are advanced in the correct alignment to be received at a proper receiving surface at the base portion.

Multi-cable terminal housing 1002 also includes latches 1060A-F attached in a row on distribution portion 1008, as shown in FIG. 8. Each latch is configured to secure a connection enclosure assembly received through a complementary enclosed channel 1011A-F below a respective latch 1060A-F. Optionally, one or more cable anchors 1036A-F may be attached to distribution portion 1008 facing away from the housing structure. Each cable anchor may be positioned in alignment with a respective enclosed channel, e.g. channel 1011A, as shown in FIG. 9. As yet another option, one or more of the cable anchors may be fitted with a strap or straps 1038A-F, as shown in FIG. 12. Such straps are configured to hold a service cable exiting the housing for distribution. in some examples, straps may be substituted with cable ties. Further details of methods of using cable enclosure 1000 are provided elsewhere in the disclosure in the description of the methods.

In the arrangement shown in FIGS. 8-12, connection enclosure assemblies 1010A-F include components as follows, with reference to first connection enclosure assembly 1010A as representative. First connection enclosure assembly 1010A includes grommet 1040A, duct 1020A and receiving base with adapter 1050A. Connection enclosure assembly 1010A is adapted to receive internal cable 1014A via internal cable connection 1015A on a first side of adapter 1050A and enclose a service cable connector 1013A of service cable 1012A on the other side of the adapter. Although cable enclosure 1000 is depicted with connection enclosure assemblies 1010A-F, it is contemplated that other variations of connection enclosure assemblies as contemplated by the present disclosure may also be incorporated into the cable enclosure. Further, depending on the characteristics of the connection enclosure assembly used, receiving surfaces on multi-cable terminal housing may be modified for holding such connection enclosure assemblies. For example, if the multi-cable terminal is configured to receive connection enclosure assemblies 310, each opening in base portion 1007 may be modified to have internal contoured surfaces to receive a respective sealing portion 334.

Materials for components of the multi-cable terminal assembly included in cable enclosure 1000 may be as described for the connection enclosure assembly elsewhere in the present disclosure. Materials of the additional housings and cable protection may be those materials deemed suitable for outdoor exposure and appropriate based on expected exposure to fiber optics or the other contents of the cables, as appropriate.

Figure 13:
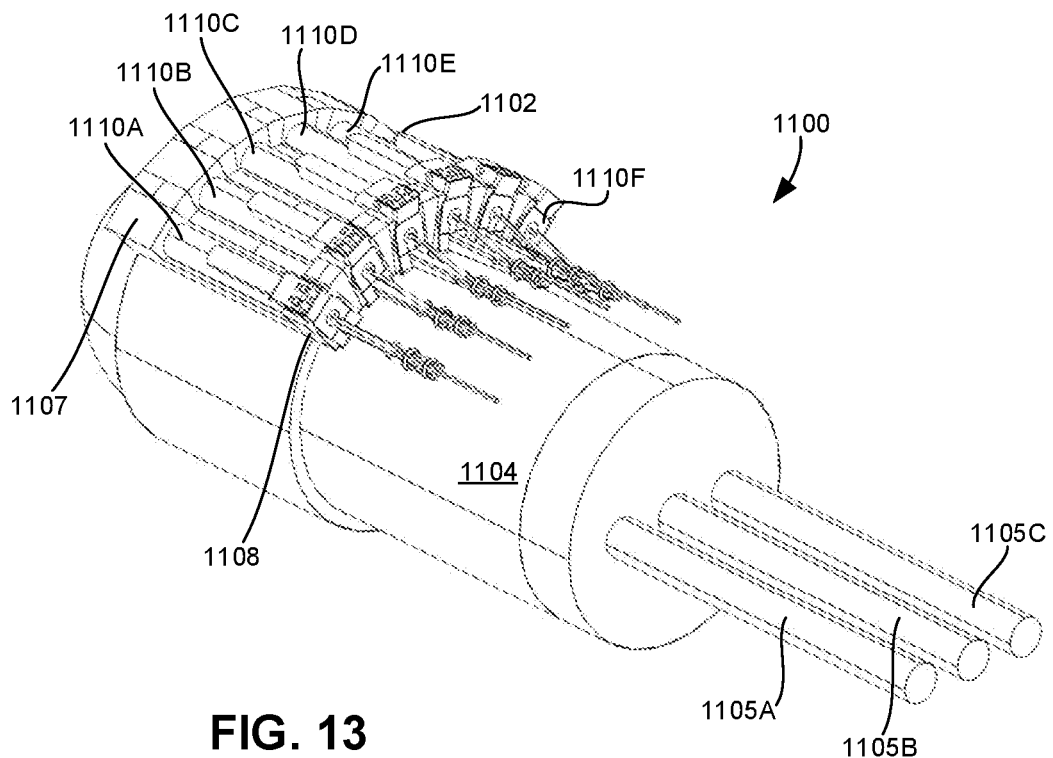
FIG. 13 illustrates a perspective view of a cable enclosure according to one embodiment of the present disclosure.

In another embodiment, a cable enclosure 1100 may be arranged as shown in FIG. 13. Reference numerals in the 1100-series of reference numerals for cable enclosure 1100 refer to like elements in the 1000-series of reference numerals, unless otherwise noted. Cable enclosure 1100 includes a multi-cable terminal housing 1102 and an input cable housing 1104, the multi-cable terminal housing being positioned on the input cable housing. In the depicted arrangement, input cable housing 1104 has a cylindrical base structure, receiving ends of main cables 1105A-C at one end, as shown in FIG. 13. Multi-cable terminal housing 1102 is shaped to conform to the cylindrical shape of the input cable housing so that a bottom surface of multi-cable terminal housing has a partially annular, concave shape to sit flush on the input cable housing. When multi-cable terminal housing 1102 has received six connection enclosure assemblies 1110A-F, as shown in FIG. 13, such assemblies are parallel to each other but define a curved, partially circular profile in section. In variations, the curve may have a varying radius of curvature such that the alignment of the assemblies is not exactly circular.

Figure 14:
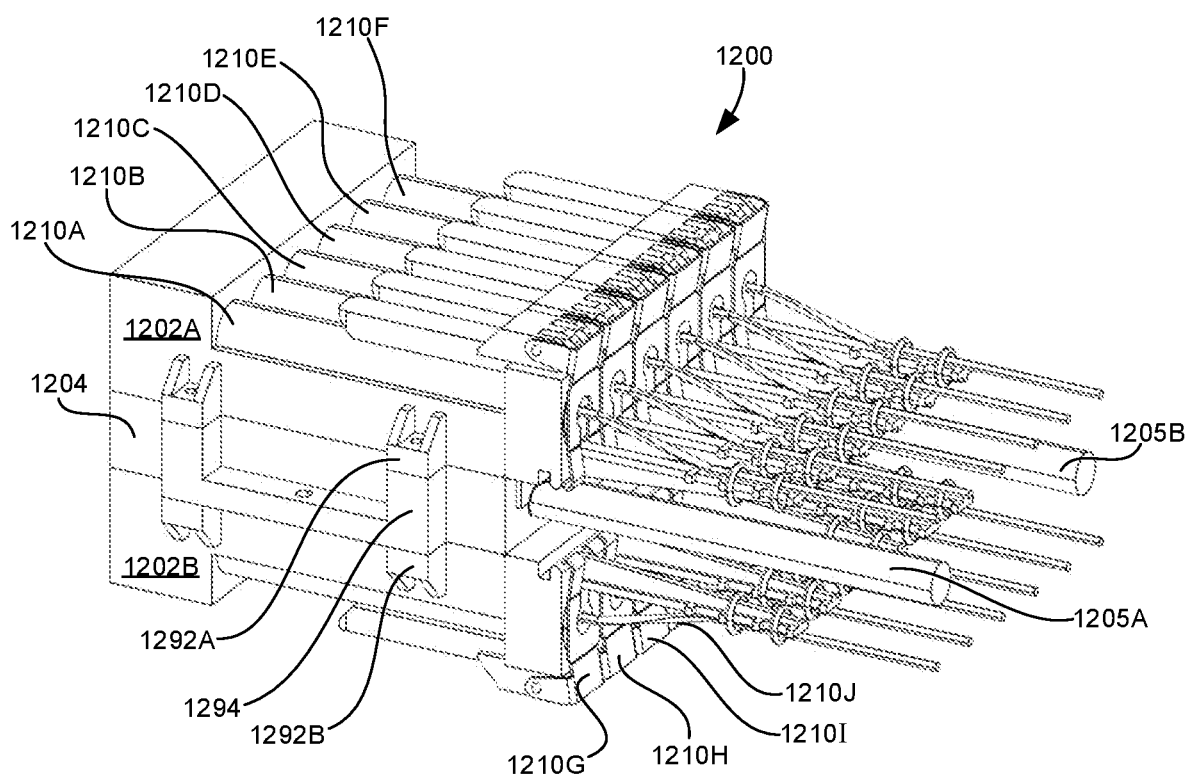
FIG. 14 illustrates a perspective view of a cable enclosure according to one embodiment of the present disclosure.

In another embodiment, a cable enclosure 1200 may be arranged as shown in FIG. 14. Reference numerals in the 1200-series of reference numerals for cable enclosure 1200 refer to like elements in the 1000-series of reference numerals, unless otherwise noted. Cable enclosure 1200 includes a pair of multi-cable terminal housing structures 1202A, 1202B that enclose an input cable housing 1204 in between, as shown in FIG. 14. Housing structures 1202A, 1202B may be secured to input cable housing 1204 via complementary connection mechanisms. In FIG. 14, such connection features 1292A, 1292B, 1294 are external to the multi-cable terminal housings and the input cable housing. These connection features may be secured to one another via screws, for example. Main cables 1205A, 1205B extend into input cable housing as shown. In the arrangement of FIG. 14, an increase in the depth of the cable enclosure, even with the same footprint, allows for the inclusion of twelve connection enclosure assemblies in place of the six that would be included in examples of a cable enclosure having a single multi-cable terminal housing structure.

Figure 15A:
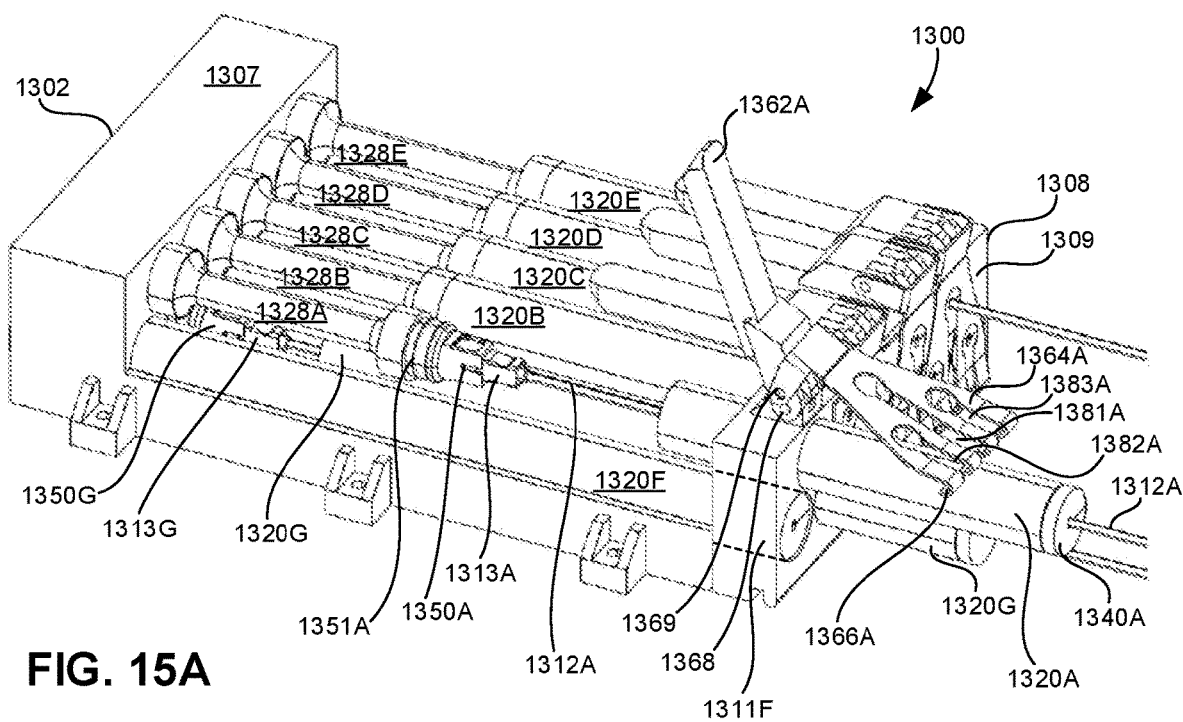
FIGS. 15A and 15B illustrate perspective and top-down views of a cable enclosure according to one embodiment of the present disclosure.
Figure 15B:
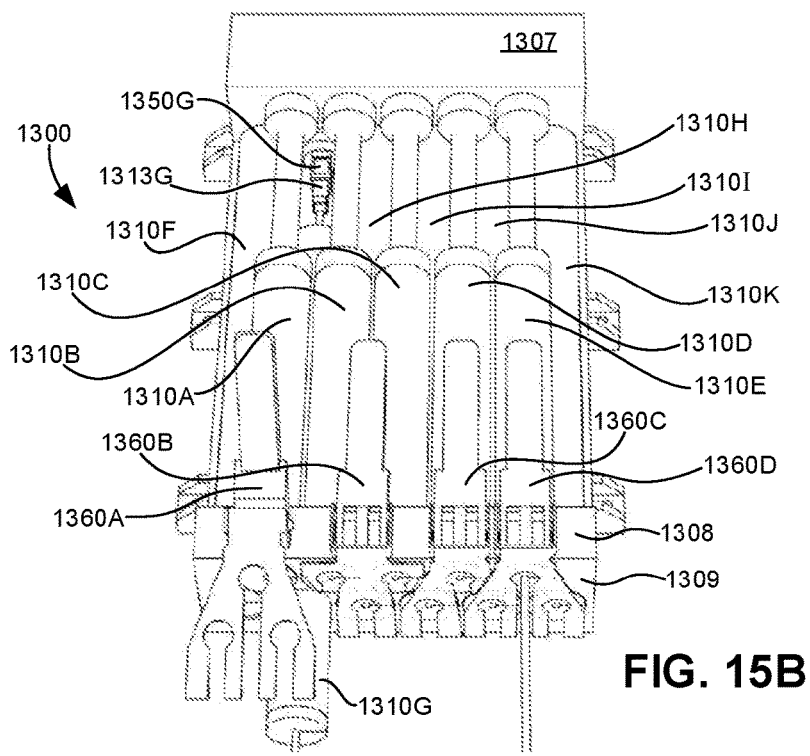

In another embodiment, a cable enclosure 1300 may be arranged as shown in FIGS. 15A-15B. Reference numerals in the 1300-series of reference numerals for cable enclosure 1300 refer to like elements in the 1000-series of reference numerals, unless otherwise noted. In FIGS. 15A-B, cable enclosure 1300 is shown inclusive of a multi-cable terminal housing 1302. However, it should be appreciated that such cable enclosure may be complemented by an input cable housing such as, in one example, input cable housing 1004 shown in FIG. 12. Multi-cable terminal housing 1302 includes a frame with end structures in the form of base portion 1307 and distribution portion 1308. Base portion 1307 includes internal passages to receive internal cables being fed from a main cable, i.e., feeder cable (not shown). In the particular arrangement depicted, there are eleven enclosed channels within base portion 1307 entering a central open region of multi-cable terminal housing 1302. Six in a bottom row, and five in a top row, corresponding to ends of connection enclosure assemblies 1310A-1310K received at base portion 1307. Distribution portion 1308 includes eleven enclosed channels passing entirely through the distribution portion and oriented such that a longitudinal axis of each enclosed channel extends toward base portion 1307 in one direction and passes out of the housing at end face 1309 of the distribution portion in the other. Each enclosed channel is sized to receive a connection enclosure assembly 1310A-1310K. The arrangement of the enclosed channels, with a zig-zag type pattern when viewed in section, may also be described as a honeycomb shaped alignment.

Cable enclosure 1300 also includes latches 1360A-D disposed on a top surface of distribution portion, each having a hinged attachment configured to cover enclosed channels 1011A-K on end face 1309. Each latch is sized to cover more than one enclosed channel. Latch 1360A is representative of the latches on cable enclosure 1300 and is described in detail for purposes of conveying certain features of the latches. However, it should be appreciated that the particular shape of each latch may vary somewhat from that shown for latch 1360A, although the principal operation of each latch is similar. For example, latch 1360C covers two enclosed channels in its closed position, as shown in FIG. 15B, rather than three enclosed channels. Latch 1360A includes lever arm 1362A and closure arm 1364A. Lever arm 1362A is hingedly attached to distribution portion 1308 via housing pin 1368 such that lever arm 1362A is rotatable about an axis through the housing pin. Further, closure arm 1364A is hingedly attached to lever arm 1362 via arm pin 1369 such that closure arm 1364A is rotatable relative to the lever arm about an axis through arm pin. Closure arm 1364A flares outward from the arm pin to a free end with hook-shaped grips 1366A. A body of closure arm 1364A includes three separate slots 1381A, 1382A, 1383A each oriented lengthwise along closure arm 1364 and extending from the free end and terminating internally within the closure arm. Each slot may include a bulbous opening shape at its enclosed end region, as shown in FIGS. 15A-B. Closure arm 1364A is sized so that when closed over end face 1309 of distribution portion 1308, the closure arm prevents backout of three separate connection enclosure assemblies. For latch 1360A, these include connection enclosure assemblies 1310A, 1310F, 1310G. Closure arm 1364A is also configured such that grips 1366A are securable to notch 1308 on a bottom surface of the distribution portion.

It should also be appreciated that cable enclosure 1300, having two layers of connection enclosure assemblies, may include a modified structure for receipt of connection enclosure assemblies in the top row. In FIGS. 15A-B, this encompasses connection enclosure assemblies 1310A-1310E. Specifically, each of the enclosures on the top row includes a narrower segment adjacent to the base portion 1307, these narrower segments referred to as base ducts. Having base ducts in the top row provides improved access to connection locations in the lower row of connection enclosure assemblies, i.e., assemblies 1310F-K in FIGS. 15A-B, to aid in connection and sealing of cable ends in the lower row. For example, and as shown in FIG. 15B, with the narrower base ducts on the upper row, the service cable end 1313G of connection enclosure assembly 1310G is accessible from above.

In some examples, base ducts 1328A-E may be separate from connection enclosure assemblies 1310A-E and may be fabricated as attached to base portion 1307 before receipt of such connection enclosure assemblies, as is shown in FIGS. 15A-B. One example of how the base duct appears before receipt of a connection enclosure assembly is shown via base duct 1328A in FIG. 15A. Further, and with continued reference to base duct 1328A as representative, a central support with receiving surface 1351A and adapter 1350A are pre-attached to and/or integral with base duct 1328A as part of multi-cable terminal housing 1302. In this manner, cable enclosure 1300 is configured such that ducts 1320A-E, i.e., ducts receivable in the upper row, are shorter than those in the lower row, the leading ends of which are received at receiving surfaces protruding significantly from the base duct. Thus, a leading end of duct 1320A is advanceable over receiving surface 1351A to create a sealed connection, as described in greater detail elsewhere in the present disclosure. With continued reference to base duct 1328A, an inner cable fed from a main cable may be run through base duct 1328A and into an end of adapter 1350A opposite the end located to receive service cable end 1313A.

Figure 16:
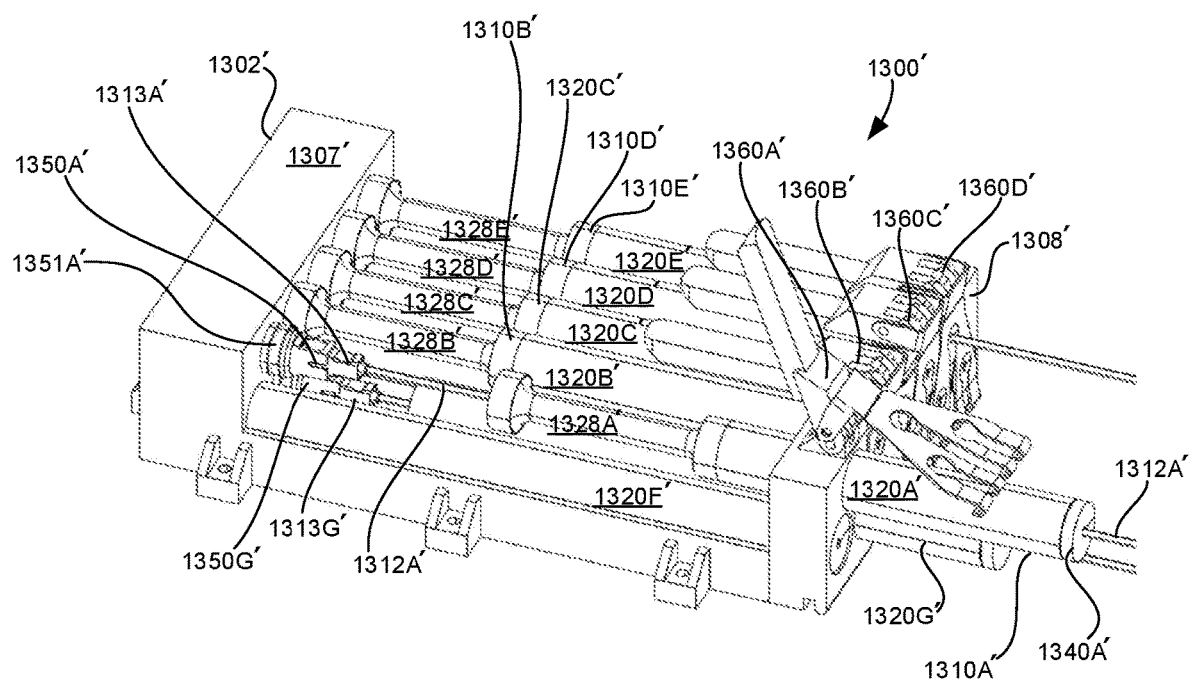
FIG. 16 illustrates a perspective view of a cable enclosure according to one embodiment of the present disclosure.

In other examples, the base duct may be part of the connection enclosure assembly itself, as shown in cable enclosure 1300' in FIG. 16. Reference numerals in the 1300'-series of reference numerals for cable enclosure 1300' refer to like elements in the 1300-series of reference numerals, unless otherwise noted. Cable enclosure 1300' is substantively the same as cable enclosure 1300 but for two differences. The base ducts in the upper row each form part of a respective connection enclosure assembly. Specifically, base ducts 1328A'-1328E' are part of connection enclosure assemblies 1310A'-1310E', respectively. And, receiving surfaces and adapters for each connection enclosure assembly in the top row are directly attached to base portion 1307', as shown, for example, by receiving surface 1351A' and adapter 1350A' in FIG. 16. In the depicted embodiment, a leading end of the base ducts may have a slightly larger relative diameter for a limited length commensurate with that necessary to accommodate passage of the base duct over the adapter when the base duct is closed over a respective receiving surface.

One advantage of cable enclosures 1200, 1300 and 1300' is that such enclosures minimize a volume occupied by the enclosure relative to the number of protected cable end connections provided. For instance, cable enclosure 1200 utilizes both a top and bottom surface of input cable housing 1204 to distribute connection enclosure assemblies in two rows, while cable enclosures 1300, 1300' utilize a honeycomb arrangement to maximize the number of connection enclosure assemblies within the multi-cable terminal.

Figure 17:
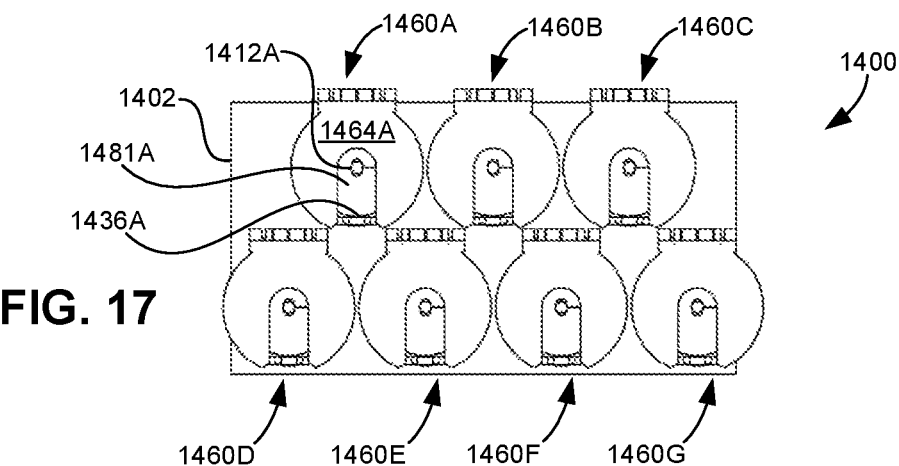
FIGS. 17 and 18 illustrate front and perspective views, respectively, of a cable enclosure according to one embodiment of the present disclosure.
Figure 18:
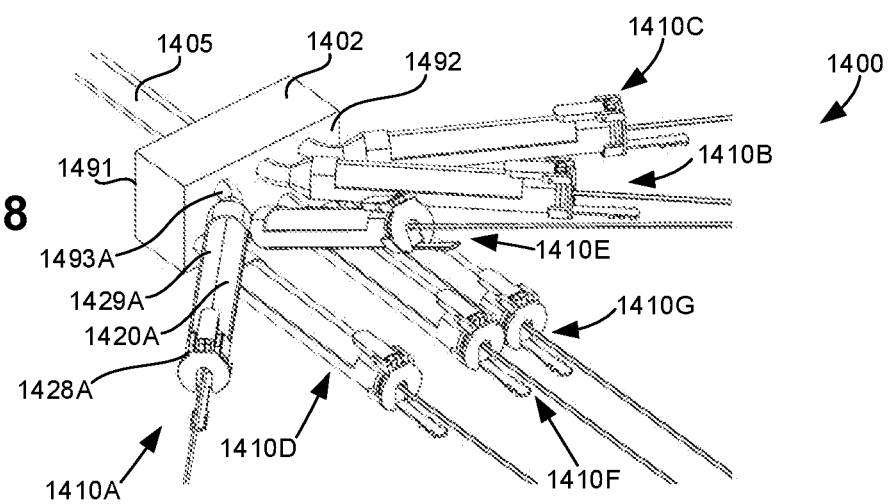

In another embodiment, a multi-cable terminal 1400 may be arranged as shown in FIG. 17-18. Reference numerals in the 1400-series of reference numerals for multi-cable terminal 1400 refer to like elements in the 1000-series of reference numerals, unless otherwise noted. Multi-cable terminal 1400 includes a multi-cable terminal housing 1402, a main cable 1405, and is configured to receive a plurality of connection enclosure assemblies. In the example depicted in FIGS. 17-18, main cable 1405 is on a receiving face of multi-cable terminal housing 1402 and the housing includes seven passages or access openings on a distribution face 1492 opposite the receiving face to receive up to seven connection enclosure assemblies, such as connection enclosure assemblies 1410A-1410G. It should be appreciated that in other examples, main cable 1405 may include two or more separate input locations on the housing and may also enter the housing on distribution face 1492.

Each connection enclosure assembly 1410A-1410G is similar to connection enclosure assembly 210 shown in FIGS. 4-5, and like reference numerals in the 1400 series of numerals for connection enclosure assembly 1410 refer to like elements in the 200 series of numerals, unless otherwise stated below. Connection enclosure assembly 1410A, representative of assemblies 1410A-G, includes an outer enclosure 1428A configured to receive duct 1420A. An end of outer enclosure 1428A opposite latch 1460A, configured for receipt in multi-cable terminal housing 1402, includes a resilient extension portion 1493A that extends from a body of outer enclosure 1428A to the housing. Resilient extension portion 1493A is configured to securely engage with multi-cable terminal housing 1402 and may have a tapered portion and narrower diameter than a remainder of the outer enclosure. Resilient extension portion may have resilient material properties such that a rotational position of connection enclosure assembly 1410A may be manipulated relative to the housing, as shown for connection enclosure assemblies 1410A, 1410B, 1410C and 1410E in FIG. 18. Exemplary materials for the extension portion may be PVC, nylon, durable plastics adapted for outdoor environments, bendable sealed metal conduit or outside plant fiber optic cable, for example. In instances where PVC, nylon or durable plastics are used, such materials may optionally be supplemented by an internally disposed metal layer that may provide reinforcement and/or preserve a desired angulation of a connection enclosure assembly. It should be appreciated that in variations, a quantity of connection enclosure assemblies receivable in the multi-cable terminal housing may vary from that shown. Additionally, as an option, any number of the ducts of assemblies 1410A-1410G may be bundled together with a strap.

Figure 19:
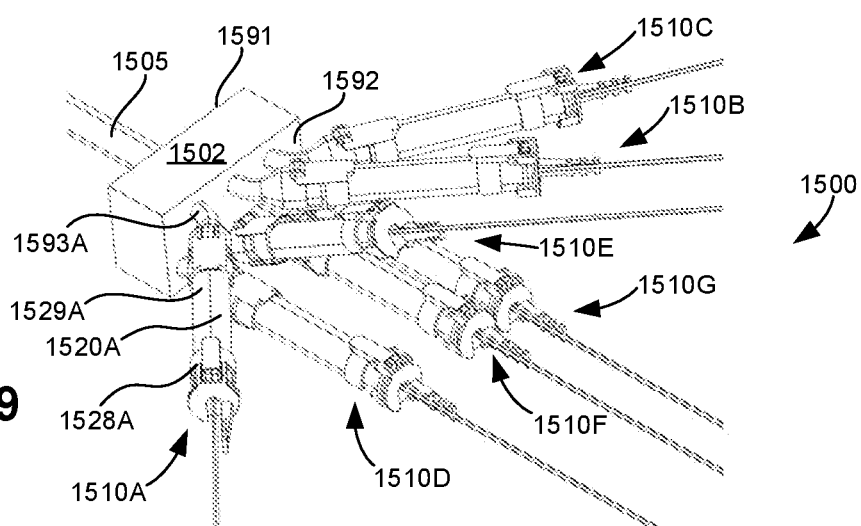
FIG. 19 illustrates a perspective view of a cable enclosure according to one embodiment of the present disclosure.

In another embodiment, a multi-cable terminal 1500 may be arranged as shown in FIG. 19. Reference numerals in the 1500-series of reference numerals for multi-cable terminal 1500 refer to like elements in the 1400-series of reference numerals, unless otherwise noted. Multi-cable terminal 1500 includes multi-cable terminal housing 1502, main cable 1505 and is configured to receive a plurality of connection enclosure assemblies. In the example depicted in FIG. 19, multi-cable terminal housing 1502 includes seven passages or access openings on a distribution face 1592 to receive up to seven connection enclosure assemblies, such as connection enclosure assemblies 1510A-1510G. Each connection enclosure assembly 1510A-1510G is similar to connection enclosure assembly 310 shown in FIGS. 6-7, and like reference numerals in the 1500 series of numerals refer to like elements in the 300 series of numerals, unless otherwise stated below. Further, as with connection enclosure assemblies 1410A-1410G, each connection enclosure assembly 1510A-G includes a resilient extension portion, such as extension portion 1591A for assembly 1510A. It should be appreciated that in variations, a quantity of connection enclosure assemblies receivable in the multi-cable terminal housing may vary from that shown. Additionally, as an option, any number of the ducts of assemblies 1510A-1510G may be bundled together with a strap.

The cable enclosures described in this application may be varied in many ways. For example, any contemplated cable enclosure may instead be a standalone multi-cable terminal without an input cable housing. In other examples, a quantity of connection enclosure assemblies may vary relative to the number included in the contemplated multi-cable terminals, having more or fewer than the quantity described. In further examples, and for the avoidance of doubt, any of the contemplated multi-cable terminal housings may include additional structure between the base portion and distribution portion to support and align ducts received in the multi-cable terminal housing. For example, a series of contoured surfaces in the form of concave troughs, e.g., open-faced channels, may be disposed within the multi-cable terminal housing such that an elongate dimension of each trough extends between the base portion and the distribution portion. A multi-cable terminal housing may include a trough for each enclosed channel sized to receive a connection enclosure assembly, and may be longitudinally aligned with a respective enclosed channel. In some examples, a quantity of main cable inputs and their entry location on the multi-cable terminal housing may vary from that shown in the depicted embodiments. Contemplated embodiments may have one, two, three or more main cable input locations.

Figure 20:
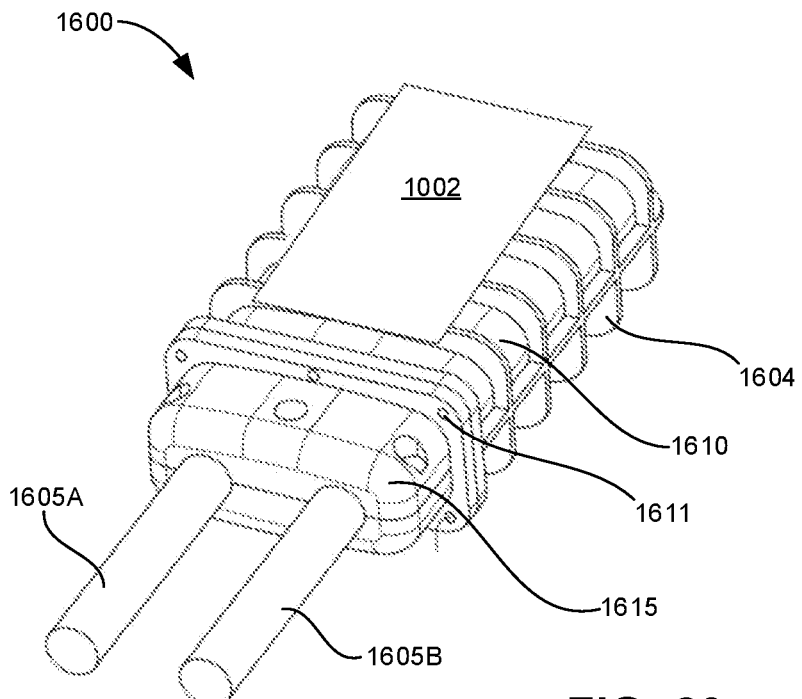
FIG. 20 illustrates a perspective view of a cable enclosure according to one embodiment of the present disclosure.
Figure 21:
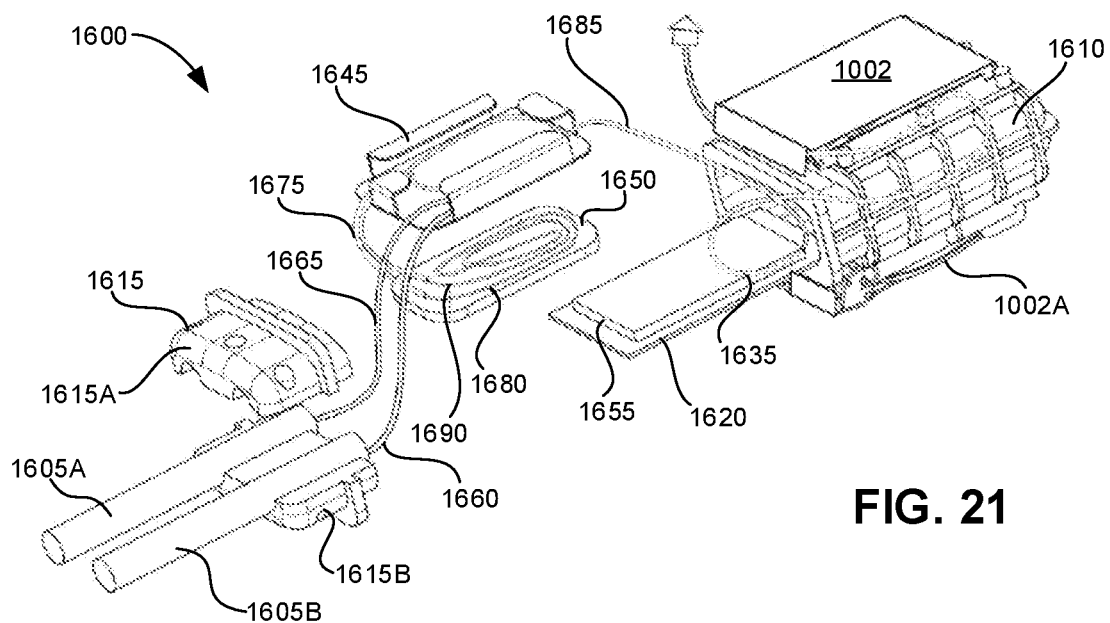
FIG. 21 illustrates an exploded view of the cable enclosure of FIG. 20.

Another embodiment of a cable enclosure is shown in FIGS. 20-21. FIG. 20 is a perspective view of cable enclosure 1600 according to one embodiment. The cable enclosure 1600 includes a housing 1604 having a main portion 1610, a sealing assembly 1615, and one or two multi-cable terminals 1002, 1002A. In FIG. 20, multi-cable terminal housing 1002 is indicated schematically as one example of the multi-cable terminal, although it should be appreciated that other multi-cable terminals as contemplated by the present disclosure may also be included. Where two multi-cable terminal housings are included, such terminals may be disposed on opposing surfaces, as shown in FIG. 21. The terminals may be mounted on main portion 1610 or may be integral with the main portion. The sealing assembly 1615 may be configured to accommodate two main cables 1605A and 1605B. One or more fibers from the two main cables 1605A and 1605B are coupled to the multi-cable terminal 1002, which includes multiple connection enclosure assemblies.

FIG. 21 is an exploded perspective view of cable enclosure 1600 and illustrates its parts and internal cable routing disposed in the enclosure. As can be seen from the figure, the sealing assembly 1615 may be made up of two halves, a first half 1615A and a second half 1615B, and the cable enclosure 1600 may include a slack tray 1645, a splice tray 1650, an option module 1655, and a separator 1620. The slack tray 1645, splice tray 1650, option module 1655, and separator 1620 are internal to the cable enclosure 1600 when the enclosure is fully assembled. Although depicted in a particular order of disposal of one over another within main portion 1610, the trays and separator may be overlaid in any order within the housing.

The option module 1655 is an optional element and may or may not be included in the cable enclosures described in this disclosure. The option module 1655 may include any one or more of a splitter, a tap filter, a wavelength division multiplexer (WDM) filter, an opto-electronics module, and the like.

In FIG. 21, main cable 1605A includes a multiple of sub-cables 1665, and main cable 1605B includes a multiple of sub-cables 1660. One or more of the sub-cables 1660, 1665, that is one or more of the cables taken from either sub-cables 1660 or sub-cables 1665, or from both sub-cables 1660 and sub-cables 1665, is routed from the slack tray 1645 to the splice tray 1650, illustrated by cable 1675 in FIG. 21. At the splice tray 1645, one or more fibers from cable 1675, illustrated by fiber 1680, is spliced to one or more fibers from an intermediate cable 1685, illustrated by fiber 1690. Intermediate cable 1685 also has slack stored in slack tray 1645 and is routed between the slack tray 1645 and the option module 1655. The intermediate cable 1685 is coupled to the option module 1655. Further, an internal cable 1635 coupled to the option module 1655 passes through the separator 1620 and is routed to one of the connection enclosure assemblies 1010A-F of multi-cable terminal housing 1002.

Regarding the option module 1655, if the option module 1655 is not included in cable enclosure 1600, the cable 1685 may be routed directly from the slack tray 1645 to the separator 1620, and pass through the separator 1620 such that the internal cable 1635 is merely a continuation of the cable 1685.

Regarding cables 1635 and 1685, the cables are used merely as illustrations. The number of cables passing from the splice tray 1650 to the slack tray 1645 and on to the option module 1655 is not limited to one cable, and may be a multiple of cables. Similarly, the number of cables passing from the option module 1655 to the multi-cable terminal housing 1002 is not limited to one cable, and may be a multiple of cables.

As can be seen from both FIGS. 20 and 21, the sealing assembly 1615 of the housing 1604 may be coupled to the main portion 1610 of the housing 1604 by a plurality of screws 1611, although upon viewing this disclosure one skilled in the art will readily appreciate the numerous alternative techniques for coupling the sealing assembly 1615 to the main portion 1610. For example, a draw-latch may be included for coupling. In another example, a sealing clamp ring sized for disposal around a perimeter of the sealing assembly-main portion interface may be included for coupling.

Cable enclosure 1600 may be varied in many ways. For example, cable enclosure 1600 may be modified in any manner contemplated in commonly-owned U.S. patent application Ser. No. 17/876,942, the entire disclosure of which is hereby incorporated by reference herein. Further, cable enclosure 1600, along with all other contemplated cable enclosures, may include any number of main cables as inputs into the cable enclosure, and upon viewing this disclosure one skilled in the art will readily appreciate how the embodiments of the disclosure can be implemented with one, two, three, or more main cables. Moreover, the cable enclosure 1600, as well as the other cable enclosures described in the present disclosure, may be configured for affixing to a holding structure. For example, cable enclosure 1600 may include openings (not shown) for receiving screws that affix the cable enclosure 1600 to a hanger that is, in turn, used to suspend the cable enclosure 1600 from a wall or pole mount.

In another aspect, the present disclosure relates to kits. In some embodiments, a kit may include one or more cable enclosures. In other embodiments, a kit may include one or more connection enclosure assemblies. In some embodiments, a kit may include at least one cable enclosure and at least one connection enclosure assembly. Some embodiments may include a variety of cable enclosure types and/or connection enclosure assembly types in a single kit. In still further embodiments, a kit may include a multi-cable terminal in place of or in addition to a connection enclosure assembly, or a plurality of connection enclosure assemblies may themselves be a multi-cable terminal.

In yet another aspect, the present disclosure relates to methods of fabricating a connection enclosure assembly and/or a cable enclosure. Components of a connection enclosure assembly may be assembled prior to delivery to a work site, for example, at a factory. Optionally, single connection enclosure assemblies may be fabricated with cable portions prepared for use with the connection enclosure assembly prior to delivery. Components of a cable enclosure may be assembled prior to delivery to a work site. For example, a multi-cable terminal may be pre-assembled with an input cable housing at a fabrication site, such as a factory.

In yet another aspect, the present disclosure relates to methods of using one or more components of the contemplated cable end sealing structures. In one embodiment, cable portions 12, 14 are secured to one another and enclosed in a watertight sealed volume using connection enclosure assembly 10 as shown in FIGS. 1-2. First, cable connector 13 is connected to adapter 50 so that both cable portions are in operative communication with each other. It should be recognized that second cable portion 14 may already at this time be connected to adapter 50 via second cable connector 15 disposed within second sealing portion 34. With cable ends connected, the method proceeds with securement of duct 20 to second sealing portion 34. For second sealing portion 34, duct 20 is received between upper and lower parts of second grip portion 75 such that when duct 20 is fully received, projections 77 snap or catch over second stopper ring 26 to hold duct 20 in place relative to second sealing portion 34. In this manner, stopper ring 26, and indeed other stopper rings contemplated by the present disclosure, function as a mechanical grip for the projections of the sealing portion. Additionally, receiving surface 51 engages an inner surface of duct 20 to seal second end 22. Securement of second sealing portion 34 is followed by securement of first sealing portion 32. Prior to closure of the first sealing portion, grommet 40 is advanced toward and disposed within the lumen of duct 20 from first end 21. If cable portion 12 has slack, it may be made taught prior to and/or during advancement of the grommet. First sealing portion 32 is then advanced over first end 21 of duct 20 and projections 76 snap over first stopper ring 24. This action causes the grommet to compress and create a watertight seal with the duct while also, through the catch of projections 76 over stopper ring 24, holding first sealing portion 32 against first end 21 of duct 20.

In one embodiment, cable portions 116, 117 and 118 are secured to one another and enclosed in a watertight sealed volume using connection enclosure assembly 110 as shown in FIG. 3. In this configuration, the method of using the assembly to seal the cable portions is the same as that described for assembly 10 although further including an additional initial step. In this arrangement, third cable portion 118 is pre-attached to adapter 150 within second sealing portion 134 and a second cable portion 117 may be pre-attached to adapter 150. In this manner, operative connection of first cable portion 116 and third cable portion 118 may be accomplished through a splice connection between first and second cable portions 116, 117. In one example, a splice is accomplished with the aid of a splice protection tube 111. Once the cables are operatively connected, sealing of the cable-ends may be as described for connection enclosure assembly 10. In a variant, the spliced connection may be completed first, followed by securement of second cable portion 117 to adapter 150. It should be appreciated that in any embodiment, it is contemplated that a first cable portion may have two parts connected by a splice, which may include a splice protection tube, and that such spliced connection may be completed before or during use of the connection enclosure assembly.

In one embodiment, cable portions 216 and 218 are secured to one another and enclosed in a watertight sealed volume using connection enclosure assembly 210 as shown in FIG. 4-5. The method begins by either splicing first and second cable portions 216, 217 in circumstances where second cable portion 217 is already engaged to adapter 250, or by also securing second cable portion 217 to adapter 250 as part of the process of operatively connecting all cable portions. Once cable portions 216, 217, 218 are operatively connected to one another, duct 220 is slid into a lumen of outer enclosure 228, as shown in FIG. 4. As duct 220 is advanced over a receiving surface 251 adjacent to adapter 250, a window 229 is entirely blocked by duct 220, as shown in FIG. 5. Interaction between an inner surface of duct 220 and receiving surface 251 forms a seal therebetween. At this position, a first end 221 of duct is fully within outer enclosure 228. Grommet 240 may then be slid into a lumen at first end 221 of duct, followed by actuation of latch 260. First, closure arm 264 is rotated over grommet 240 at the end of outer enclosure 228, and projection 266 on closure arm 264 snaps over annular ridge 291, as shown in FIG. 5. To lock latch 260, lever arm 262 is then pushed downward from its free end so that it lies over outer enclosure 228. Lever arm 262 may have a length sufficient to provide a tight mechanical lock through the mechanism, while remaining easy to operate. This operation forms a watertight seal at the latch-end of connection enclosure assembly 210, thereby sealing all contents within the lumen of duct 220.

In one embodiment, cable portions 316 and 318 are secured to one another and enclosed in a watertight sealed volume using connection enclosure assembly 310 as shown in FIG. 6-7. The method begins with connection of first cable connector 313 to adapter 350, a spliced connection between first and second cable portions 316, 317, or both. The method continues by securing duct 320 over sealing portion 334. Specifically, second end 322 of duct 320 is slid over receiving surface 351, e.g., a pair of rings on a central support element of sealing portion 334, to create a watertight seal. When second end 322 of duct 320 is advanced sufficiently over receiving surface 351, projection 377 of fourth grip portion 376 snaps over second stopper ring 326. From this position, first lever arm 372 of second latch 370 is rotated about second housing axis 373 to bring third grip portion 375 over an outer surface of duct 320 such that the third grip portion sits distally beyond second stopper ring 326 relative to second housing axis 373. And, in this manner, sealing portion 334 is externally secured to duct 320 at two locations: projections 377 over second stopper ring 326 and third grip portion 375 over second stopper ring 326. Each of these connections prevents axial translation of duct 320 relative to sealing portion 334. This completes the closure at sealing portion 334. For securement of latch 360, grommet 340 is disposed over first end 321 of the duct, and then first closure arm 364 is rotated over grommet 340 so that projections 383 snap over first stopper ring 324. Then, first lever arm 362 is rotated over duct 320 so that second grip portion 384 snaps into place on the outer surface of duct 320. These actions complete the creation of a watertight seal for the contents of the duct. Further, even though first closure arm 364 passes over grommet 340 to close first end 321 of duct, first closure arm 364 includes a slot 381 so that first cable portion 316 is uninterrupted by such locking action. Optionally, straps or ties may be used to secure first cable portion 316 to cable anchor 336.

In one embodiment, a cable enclosure 1000 as shown in FIGS. 8-12 is used at a site determined to be suitable for placement of the cable enclosure to distribute service cable to end use locations. During use, feeder cable may be run through input cable housing 1004 and spliced or otherwise separated to run as internal cable into one or more of the connection enclosure assemblies. In other embodiments, cable may be pre-fed into input cable housing 1004 at a fabrication stage such that source feeder cable may be spliced into the cable entering input cable housing 1004 externally to cable enclosure 1000. When ready for preparation of all service cable enclosures, one or more connection enclosure assemblies may be inserted into multi-cable terminal housing 1002. In the case of cable enclosure 1000, six connection enclosure assemblies 1010A-F may be included. The method for preparing each connection enclosure assembly within housing 1002 may be the same, and is described here for connection enclosure assembly 1010A as representative.

Figure 10:
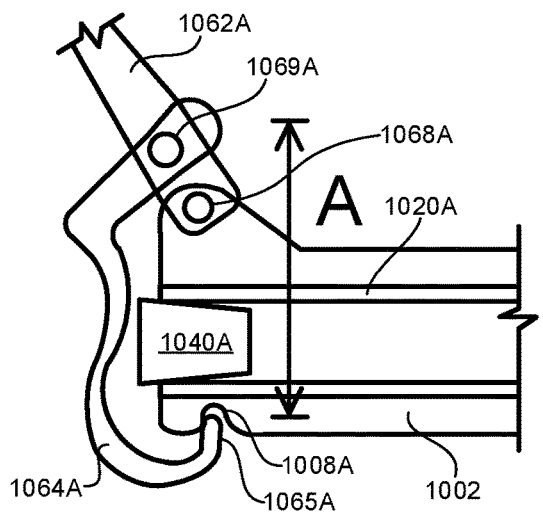
FIGS. 10 and 11 illustrate close-up side views of a latch for the cable enclosure of FIG. 8.
Figure 11:
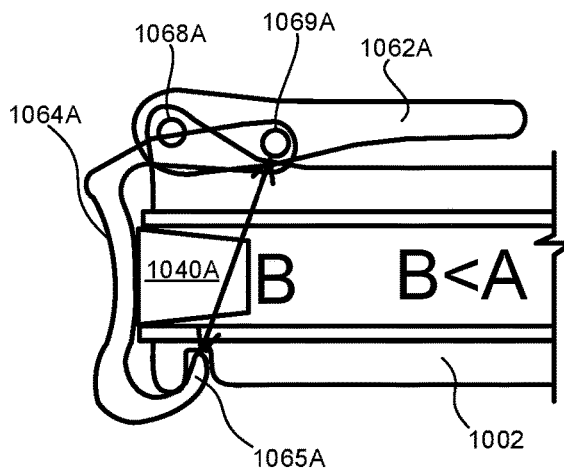

Service cable 1012A is run through housing 1002 and service cable connector 1013A is attached to adapter 1050A, as shown in FIG. 8. Duct 1020A is then passed through enclosed channel 1011A in distribution portion 1008 of housing 1002, and further to engage with receiving surface 1051A, e.g., a pair of rings disposed over a central support adjacent to the adapter. Grommet 1040A is then pressed against duct 1020A, and closure arm 1064A is rotated and brought over grommet 1040A until a hook-end of closure arm 1064A snaps over notch 1008A, as shown in FIG. 10. From this position, lever arm 1062 is rotated over duct 1020A, to tighten the enclosure of closure arm 1064A pressed against grommet 1040A, as shown in FIG. 11. Closure arm 1064A may have resilient material properties to facilitate the motion shown between FIGS. 10 and 11 and to create tension in the closure arm 1064A when latch 1060A is moved into a fully locked position. In the example shown, it can be seen that a distance between arm pin 1069A and notch 1008A decreases when lever arm 1062 is pulled into the locked position. In some variations, the grommet may be sized such that it protrudes further from the housing than grommet 1040, in turn minimizing any change in a distance between pin 1069A and notch 1008A during movement of the latch between the open and closed positions. In such a variation, the grommet has a more significant biasing function. In other variations, a surface within the notch may be supplemented with a resilient material filling, such as a rubber filling, to enhance the engagement between the closure arm and the notch. In other variations, pin 1069A may include a spring-loaded movable feature supported by an elongated slot. In one example, the spring-loaded movable feature may be biased in a compressed state in the open position of FIG. 10 and tensioned when the latch is actuated into the closed or locked position shown in FIG. 11. The method of locking the latch may be repeated for any number of additional connection enclosure assemblies, such as assemblies 1010B-1010F. Optionally, one or more service cables extending out of cable enclosure 1000 may be strapped to a respective cable anchor 1036A for added control of cable distribution, as shown in FIG. 12.

In one embodiment, a cable enclosure 1100 as shown in FIG. 13 is used at a site determined to be suitable for placement of the cable enclosure to distribute service cable to end use locations. Use of cable enclosure 1100 may be the same as described for cable enclosure 1000 above.

In one embodiment, a cable enclosure 1200 as shown in FIG. 14 is used at a site determined to be suitable for placement of the cable enclosure to distribute service cable to end use locations. While feeding of cable into cable enclosure 1200 via main cables 1205A, 1205B may be the same as that described for cable enclosure 1000, further separation and or splitting may be utilized to direct the feeder cable, i.e., main cable (not shown) into respective connection enclosure assemblies, 1210A-1210F above input cable housing 1204 and connection enclosure assemblies (partially shown) below input cable housing 1204.

In one embodiment, a cable enclosure 1300 as shown in FIGS. 15A-B is used at a site determined to be suitable for placement of the cable enclosure to distribute service cable to end use locations. During use of cable enclosure 1300, the lower row connection enclosure assemblies 1310F-1310K may be deposited into multi-cable terminal housing 1302 in the same manner described for cable enclosure 1000. For the upper row of assemblies, an adapter and surrounding area is accessible in a middle region of the housing between base portion 1307 and distribution portion 1308. While the adapter access location in the housing for the upper row is offset relative to that in the lower row, the steps of connecting and sealing cable ends is the same. For example, cable end 1313A may be connected to adapter 1350A, then duct 1320A may be sealed via advancement of duct 1320A over receiving surface 1351A and closure of latch 1360A. Because of the space between base ducts 1328A-E, it is not necessary to close all pertinent connection enclosure assemblies in the lower row before closing those on the upper row. This is evident from FIG. 15B, where it can be seen that all upper row connection enclosure assemblies 1310A-E are closed, while duct 1320G for connection enclosure assembly 1310G is not fully received in the housing. Because there is space to access cable end 1313G between the upper base ducts, the method is not impeded by this order of duct insertion. Of course, as with other contemplated cable enclosures, a main cable may be fed as internal cable into each respective adapter so that when a service cable end, such as cable end 1312A, is connected to adapter, a signal from the main cable may be transmitted through the service cable. It should also be appreciated that because each latch 1360A-D is sized to hold more than one connection enclosure assembly, the method may proceed by inserting two or three connection enclosure assemblies into the housing prior to locking the respective latch. For example, if connection enclosure assemblies 1310A, 1310F and 1310G are to be deposited into the housing, each may be fully inserted into the housing before latch 1360A is closed and locked.

Similar to cable enclosure 1300, methods of using cable enclosure 1300' do not require depositing of all pertinent ducts in a lower row before depositing of those in the upper row for the same reasons as described above. In cable enclosure 1300', the lower row is either entirely accessible if the connection enclosure assembly above it is not in place, as is the case for connection enclosure assembly 1320F' below assembly 1320A' in FIG. 16, or the only structure above the lower row is a base duct. For the reasons described above, cable ends and adapters in a lower row of enclosure 1300' remain accessible even if base ducts of the connection enclosure assemblies directly above are abutting base portion 1307'.

In one embodiment, a multi-cable terminal 1400 as shown in FIG. 17-18 is used at a site determined to be suitable for placement of the multi-cable terminal to distribute service cable to end use locations. A method of using multi-cable terminal may be based on repeating the steps described for using connection enclosure assembly 210. Each connection enclosure assembly 1410A-1410G may be secured to multi-cable terminal housing 1402 at a fabrication stage. During sealing of the respective connection enclosure assemblies, the resilient extension portion (e.g., extension portion 1493A) properties allow for rotational movement of one or more of the connection enclosure assemblies to increase space to access other connection enclosure assemblies. An active use of this feature is shown in FIG. 18 where some of the connection enclosure assemblies are moved to make it easier to access those on the lower row. In an additional optional step, any number of the ducts of assemblies 1410A-1410G may themselves be bundled together with a strap. A method of using multi-cable terminal 1500 may be the same as that described for multi-cable terminal 1400.

In one embodiment, a cable enclosure 1600 as shown in FIGS. 20-21 is used at a site determined to be suitable for placement of the cable enclosure to distribute service cable to end use locations. The methods of using multi-cable terminal housing may be as described for the other embodiments of the present application. The methods of using cables fed through housing 1604 may be as described elsewhere in the present disclosure or as described in U.S. patent application Ser. No. 17/876,942.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A system for sealing a cable connection against external elements comprising:
    a housing;
    a duct having a first end and a second end and being configured to internally accommodate at least one cable connection element and an end of a cable;
    a first sealing portion disposed in the housing, the first sealing portion engageable to the first end of the duct such that when the first sealing portion is engaged to the first end of the duct a watertight seal is created between the first sealing portion and the first end of the duct;
    wherein the first sealing portion is resilient such that the duct is rotationally movable relative to the housing; and
    a second sealing portion engageable to the second end of the duct such that when the second sealing portion is engaged to the second end of the duct and the end of the cable is engaged to the second sealing portion a watertight seal is created between the second sealing portion and the second end of the duct and between the second sealing portion and the end of the cable.

2. The system according to claim 1, wherein the duct is cylindrically shaped.

3. The system according to claim 1, wherein the first sealing portion comprises at least one O-ring for mating with the first end of the duct.

4. The system according to claim 1, wherein the second sealing portion comprises a grommet configured for insertion into the second end of the duct and having an opening for accommodating the cable.

5. The system according to claim 1, further comprising a restraint for engaging the second sealing portion to the second end of the duct.

6. The system according to claim 1, wherein the at least one cable connection element comprises an adapter.

7. A system for sealing a cable connection against external elements comprising:
    a housing having at least one contour provided on the exterior of the housing, and at least one first sealing portion associated with respective ones of the at least one contour, each first sealing portion positioned at a first end of the housing and aligned with the corresponding contour of the at least one contour and configured to secure at least one cable connection element; and
    at least one duct positioned on respective ones of the at least one contour, each duct having a first end and a second end and being configured to internally accommodate the at least one cable connection element and at least one end of a cable, the first end of the duct being engageable to the first sealing portion such that when the first sealing portion is engaged to the first end of the duct a watertight seal is created between the first sealing portion and the first end of the duct, and the second end of the duct being engageable to a second sealing portion such that when the second sealing portion is secured to the second end of the duct and the cable is engaged to the second sealing portion, a watertight seal is created between the second sealing portion and the second end of the duct and between the second sealing portion and the end of the cable, and a portion of the duct proximate to the second end of the duct is disposed on the respective ones of the at least one contour.

8. The system according to claim 7, wherein the at least one duct is cylindrically shaped.

9. The system according to claim 7, wherein the second sealing portion comprises a grommet configured for insertion into the second end of the duct and having an opening for accommodating the cable.

10. The system according to claim 7, wherein the housing comprises at least one cable anchor corresponding to respective ones of the at least one contour.

11. The system according to claim 7, wherein the at least one contour further comprises a plurality of contours and each contour of the plurality of contours are arranged in a linear alignment with each other.

12. The system according to claim 7, wherein each first sealing portion comprises at least one O-ring for mating with the first end of the corresponding duct.

13. The system according to claim 7, wherein the housing further comprises an opening for receiving a main cable.

14. The system according to claim 7, wherein the housing further comprises a distribution portion and a base portion separated from the distribution portion by the at least one contour, and wherein a duct span including a duct of the at least one duct extends from the base portion to the distribution portion and includes a first segment proximal to the base portion with a smaller diameter than a second segment between the first segment and the distribution portion.

15. The system according to claim 7, further comprising at least one latching mechanism for securing respective ones of the at least one duct within respective ones of the at least one contour.

16. The system according to claim 15, wherein the at least one latching mechanism is configured to secure the second sealing portion to the second end of the duct upon movement of the at least one latching mechanism into a closed position.

17. The system according to claim 15, wherein for each contour of the at least one contour, when the at least one latching mechanism is in an open position, the duct is movable along a longitudinal axis of the contour.

18. The system according to claim 15, wherein each latching mechanism comprises a lever and a latch and is rotatably secured to the housing.

19. The system according to claim 15, where the housing further comprises a distribution portion and a base portion separated from the distribution portion by the at least one contour, and wherein each latching mechanism comprises a lever and a latch and is rotatably secured to the distribution portion.

20. The system according to claim 7, wherein the at least one contour further comprises a plurality of contours and each contour of the plurality of contours are arranged in a two-dimensional alignment with each other.

21. The system according to claim 20, wherein the plurality of contours are arranged in a honeycomb shaped alignment.

22. The system according to claim 20, wherein the plurality of contours are arranged in a circular shaped alignment.

23. The system according to claim 7, wherein the housing is part of a cable enclosure, the cable enclosure further comprising a main portion, and a sealing assembly for accommodating at least one main cable portion and for providing a watertight seal between the sealing assembly and the at least one main cable portion and between the sealing assembly and the main portion.

24. The system according to claim 23, wherein the main portion comprises:
    a slack tray configured to house a portion of the at least one cable portion; and
    a splice tray, and a separator configured to house at least a portion of an intermediate cable, wherein one or more fibers from the at least one main cable portion are spliced to one or more fibers from the intermediate cable at the splice tray.

25. The system according to claim 23, wherein the housing is mounted on the main portion of the cable enclosure.

26. The system according to claim 23, wherein the housing is an integral part of the main portion of the cable enclosure.

* * * * *